United States Patent [19]
Song et al.

[11] Patent Number: 5,773,053
[45] Date of Patent: Jun. 30, 1998

[54] CHEWING GUM BASE MANUFACTURING PROCESS USING PLURALITY OF SOFTENING AGENTS INLETS

[75] Inventors: Joo H. Song, Northbrook; Donald J. Townsend, Chicago, both of Ill.

[73] Assignee: Wm. Wrigley Jr. Company, Chicago, Ill.

[21] Appl. No.: 809,376

[22] PCT Filed: Mar. 13, 1995

[86] PCT No.: PCT/US95/03127

§ 371 Date: Mar. 12, 1997

§ 102(e) Date: Mar. 12, 1997

[87] PCT Pub. No.: WO96/08159

PCT Pub. Date: Mar. 21, 1996

Related U.S. Application Data

[63] Continuation-in-part of Ser. No. 362,254, Dec. 22, 1994, Pat. No. 5,543,160, Continuation-in-part of Ser. No. 305, 363, Sep. 13, 1994, abandoned, and a continuation-in-part of Ser. No. 141,281, Oct. 22, 1993, Pat. No. 5,419,919, and a continuation-in-part of Ser. No. 135,589, Oct. 14, 1993, Pat. No. 5,486,366, which is a continuation-in-part of Ser. No. 126,319, Sep. 24, 1993, Pat. No. 5,562,936.

[51] Int. Cl.⁶ .............................................. A23G 3/30
[52] U.S. Cl. .................................... 426/3; 426/6
[58] Field of Search ............................... 426/3–6

[56] References Cited

U.S. PATENT DOCUMENTS

| H1241 | 10/1993 | Synosky et al. | 426/3 |
|---|---|---|---|
| 1,852,005 | 4/1932 | Garbutt | 426/5 |
| 1,855,017 | 4/1932 | Geller | 426/6 |
| 1,887,930 | 11/1932 | Hatherell | 426/6 |
| 1,953,295 | 4/1934 | Garbutt | 99/11 |
| 2,123,531 | 7/1938 | Hatherell | 99/135 |
| 2,125,562 | 8/1938 | Hatherell | 99/135 |
| 2,197,240 | 4/1940 | Hatherell | 99/135 |
| 2,256,190 | 9/1941 | Bowman | 107/54 |

(List continued on next page.)

FOREIGN PATENT DOCUMENTS

| 0 273 809 A2 | 7/1988 | European Pat. Off. . |
|---|---|---|
| 0 524 902 A1 | 1/1993 | European Pat. Off. . |
| 2 635 441 | 2/1990 | France . |
| 1 538 785 | 1/1979 | United Kingdom . |
| 2 049 705 | 12/1980 | United Kingdom . |
| WO 95/08272 | 3/1995 | WIPO . |
| WO 95/10194 | 4/1995 | WIPO . |
| WO 95/10947 | 4/1995 | WIPO . |
| WO 95/10948 | 4/1995 | WIPO . |
| WO 96/08159 | 3/1996 | WIPO . |
| WO 96/08160 | 3/1996 | WIPO . |
| WO 96/08161 | 3/1996 | WIPO . |
| WO 96/08162 | 3/1996 | WIPO . |

OTHER PUBLICATIONS

*Food Manufacturing*, "Extrusion: does chewing gum pass the taste test?" pp. 48–50, Sep. 1987.

*Ingredients Extra*, "Extrusion technology for chewing gum production" pp. 4 and 12, Jun. 1994.

*J. Agric. Food Chem.*, "Thermal Decomposition of Some Phenolic Antioxidants" pp. 1063–1069, vol. 39, 1991.

Two page document entitled "Mixing Processes used in the Manufacture of Chewing Gum," by R. Schilling, undated.

Three page letter from Buss America dated Aug. 22, 1989 describing Buss kneading extruder and its uses.

Brochure entitled "D–TEX Continuous Compounding Twin Screw Extruders," 4 pages, pubished by Davis–Standard (undated).

Brochure entitled "Continuous Mixers For The Plymer Industry," Bulletin No. 234–B, published by Farrel Corporation, 1991.

Brochure entitled "Farrel–Rockstedt Twin–Screw Extruders," 6 pages, published by Farrel Corporation (undated).

Brochure entitled, "Leistritz Extrusionstechnik, The Universal Laboratory Extruder System," 24 pages, published by American Leistritz Extruder Corporation (undated).

Brochure entitled, "Leistritz Extrusionstechnik, The Multi–Extrusion–System for Mixing–, Kneading– and Strandextrusion ZSE GG+GL," 20 pages, published by American Leistritz Extruder Corporation (undated).

Two page document from Rubber Extrusion Technology program, dated Feb. 8–10, 1993.

Brochure entitled "Buss Kneading Extruder Technology for the Food Industry," 18 pages, (undated).

Brochure entitled "Extrusion Processing of Shear–Sensitive Food Products," 23 pages, Nov. 1987.

Advertisement entitled "Buss Extrusion Technology (40 years of experience included)," 1 page, undated.

Brochure entitled "The Teledyne Readco Continuous Processor," 2 pages, published by Teledyne Readco, York, PA (undated).

Brochure entitled "Mitsubishi PTE Twin–Screw Extruder," 6 pages, Mitsubishi Heavy Industries, Ltd. (date unknown).

Brochure entitled "Mitsubishi Thermoplastic Extruders," 10 pages, Mitsubishi Heavy Industries, Ltd. (date unknown).

Brochure entitled "Buss Technology For The Continuous Compounding of Gum Base," by Georg Fischer of Buss Gruppe, Apr. 22, 1995, 9 pages.

(List continued on next page.)

*Primary Examiner*—Milton Cano
*Attorney, Agent, or Firm*—Steven P. Shurtz; Brinks Hofer Gilson & Lione

[57] ABSTRACT

A process for continuously producing a chewing gum base comprises the steps of continuously adding a hard elastomer, a filler and lubricating agents comprising a softening agent into a continuous mixer, subjecting the elastomer, filler and lubricating agents to a dispersive mixing operation and continuously discharging the resulting chewing gum base from the mixer while the adding and mixing steps are in progress. The softening agent is introduced into the continuous mixer at a plurality of spatially separated feed inlets. The softening agent is selected from the group consisting of fats, oils, waxes, emulsifiers and mixtures thereof.

29 Claims, 13 Drawing Sheets

U.S. PATENT DOCUMENTS

| | | | |
|---|---|---|---|
| 2,284,804 | 6/1942 | De Angelis | 99/135 |
| 2,288,100 | 6/1942 | Mason | 99/135 |
| 2,383,145 | 8/1945 | Moose | 99/135 |
| 2,468,393 | 4/1949 | Corkery et al. | 99/135 |
| 3,618,902 | 11/1971 | Brennen, Jr. | 259/6 |
| 3,795,744 | 3/1974 | Ogawa et al. | 426/3 |
| 3,826,847 | 7/1974 | Ogawa et al. | 426/3 |
| 3,984,574 | 10/1976 | Comollo | 426/4 |
| 3,995,064 | 11/1976 | Ehrgott et al. | 426/3 |
| 4,064,274 | 12/1977 | Mackay et al. | 426/3 |
| 4,068,004 | 1/1978 | Carlin et al. | 426/3 |
| 4,187,320 | 2/1980 | Koch et al. | 426/3 |
| 4,202,906 | 5/1980 | Ogawa et al. | 426/3 |
| 4,208,431 | 6/1980 | Friello et al. | 426/3 |
| 4,217,368 | 8/1980 | Witzel et al. | 426/5 |
| 4,224,345 | 9/1980 | Tezuka et al. | 426/3 |
| 4,252,830 | 2/1981 | Kehoe et al. | 426/5 |
| 4,254,148 | 3/1981 | Ogawa et al. | 426/3 |
| 4,305,962 | 12/1981 | del Angel | 426/3 |
| 4,352,822 | 10/1982 | Cherukuri et al. | 426/4 |
| 4,357,354 | 11/1982 | Kehoe et al. | 426/3 |
| 4,379,169 | 4/1983 | Reggio et al. | 426/3 |
| 4,386,106 | 5/1983 | Merritt et al. | 426/5 |
| 4,387,108 | 6/1983 | Koch et al. | 426/4 |
| 4,452,820 | 6/1984 | D'Amelia et al. | 426/3 |
| 4,459,311 | 7/1984 | DeTora et al. | 426/3 |
| 4,490,395 | 12/1984 | Cherukuri et al. | 426/3 |
| 4,514,423 | 4/1985 | Tezuka et al. | 426/3 |
| 4,515,769 | 5/1985 | Merritt et al. | 424/49 |
| 4,555,407 | 11/1985 | Kramer et al. | 426/5 |
| 4,590,075 | 5/1986 | Wei et al. | 426/5 |
| 4,711,784 | 12/1987 | Yang | 426/5 |
| 4,721,620 | 1/1988 | Cherukuri et al. | 426/5 |
| 4,738,854 | 4/1988 | Friello et al. | 426/3 |
| 4,740,376 | 4/1988 | Yang | 426/5 |
| 4,794,003 | 12/1988 | Cherukuri et al. | 426/6 |
| 4,816,265 | 3/1989 | Cherukuri et al. | 426/5 |
| 4,824,680 | 4/1989 | Bernatz et al. | 426/3 |
| 4,850,842 | 7/1989 | Van Alstine | 425/205 |
| 4,861,600 | 8/1989 | Chisari et al. | 426/3 |
| 4,872,884 | 10/1989 | Cherukuri et al. | 426/3 |
| 4,876,095 | 10/1989 | Yang | 426/3 |
| 4,882,172 | 11/1989 | Van Alstine | 425/113 |
| 4,933,189 | 6/1990 | Cherukuri et al. | 426/3 |
| 4,940,594 | 7/1990 | Van Alstine | 426/231 |
| 4,968,511 | 11/1990 | D'Amelia et al. | 426/6 |
| 4,992,280 | 2/1991 | Yung Chu et al. | 426/5 |
| 5,023,093 | 6/1991 | Cherukuri et al. | 426/3 |
| 5,045,325 | 9/1991 | Lesko et al. | 426/5 |
| 5,059,103 | 10/1991 | Bruckman et al. | 425/67 |
| 5,075,291 | 12/1991 | DuRoss | 514/60 |
| 5,110,607 | 5/1992 | Yang | 426/3 |
| 5,135,760 | 8/1992 | Degady et al. | 426/5 |
| 5,158,725 | 10/1992 | Handa et al. | 264/40.7 |
| 5,158,789 | 10/1992 | DuRoss | 426/3 |
| 5,229,148 | 7/1993 | Copper | 426/502 X |
| 5,324,530 | 6/1994 | Kehoe et al. | 426/516 |
| 5,362,500 | 11/1994 | Mazurek et al. | 426/5 |
| 5,397,580 | 3/1995 | Song et al. | 426/5 |
| 5,413,799 | 5/1995 | Song et al. | 426/6 X |
| 5,415,880 | 5/1995 | Song et al. | 426/6 X |
| 5,419,919 | 5/1995 | Song et al. | 426/5 |
| 5,486,366 | 1/1996 | Song et al. | 426/5 |
| 5,523,097 | 6/1996 | Song et al. | 426/3 |
| 5,538,741 | 7/1996 | Richey et al. | 426/4 |
| 5,543,160 | 8/1996 | Song et al. | 426/3 |
| 5,545,416 | 8/1996 | Broderick et al. | 426/3 |
| 5,562,936 | 10/1996 | Song et al. | 426/3 |
| 5,571,543 | 11/1996 | Song et al. | 426/5 |
| 5,612,071 | 3/1997 | Song et al. | 426/3 |

OTHER PUBLICATIONS

Brochure entitled "Buss Technology For The Continuous Compounding of Chewing Gum and Bubble Gum," by Bernd Rose of Buss Gruppe, Apr. 24, 1995, 8 pages.

Brochure entitled "Production of Chewing Gum and Bubble Gum Masses on the Buss Kneading–Extruder," Mar. 1985, 8 pages.

Brochure entitled, "Verfahrenstechnieche Orientierung NR, 42" (Process Technology Guide No. 42), Aug. 22, 1983, 25 pages (and an English translation thereof, 15 pages).

Article entitled, "Herstellung und Aromatisierung von Kaugummi auf Basis von Saccharose und Zuckeraustrausch-stoffen," Jan. 1981, 21 pages.

Article entitled, "Chewing Gum Formulation," from *The Manufacturing Confectioner,* Sep. 1988, 8 pages.

Brochure entitled, "Chewing Gum," by Axel H. Suck, 59 pages, undated.

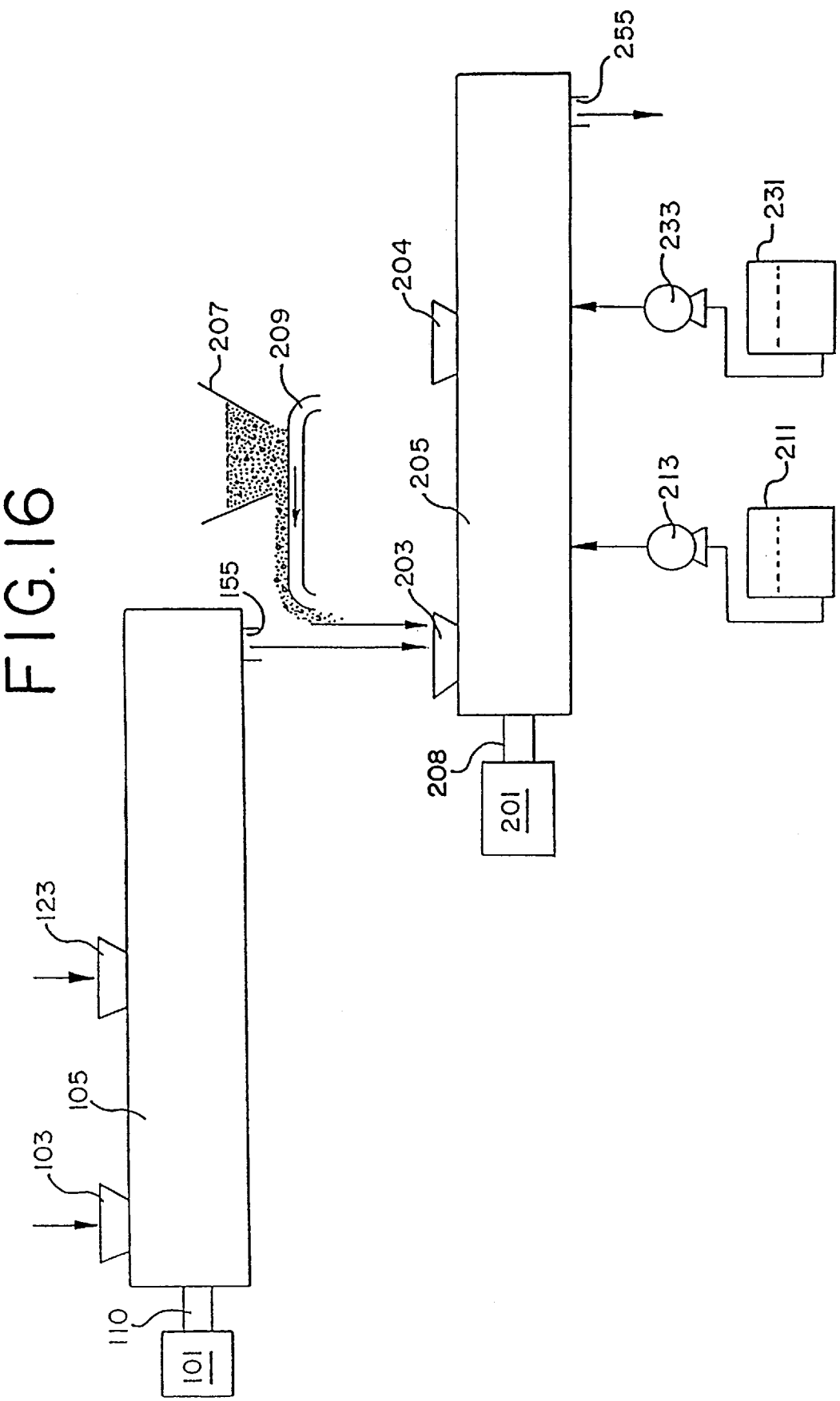

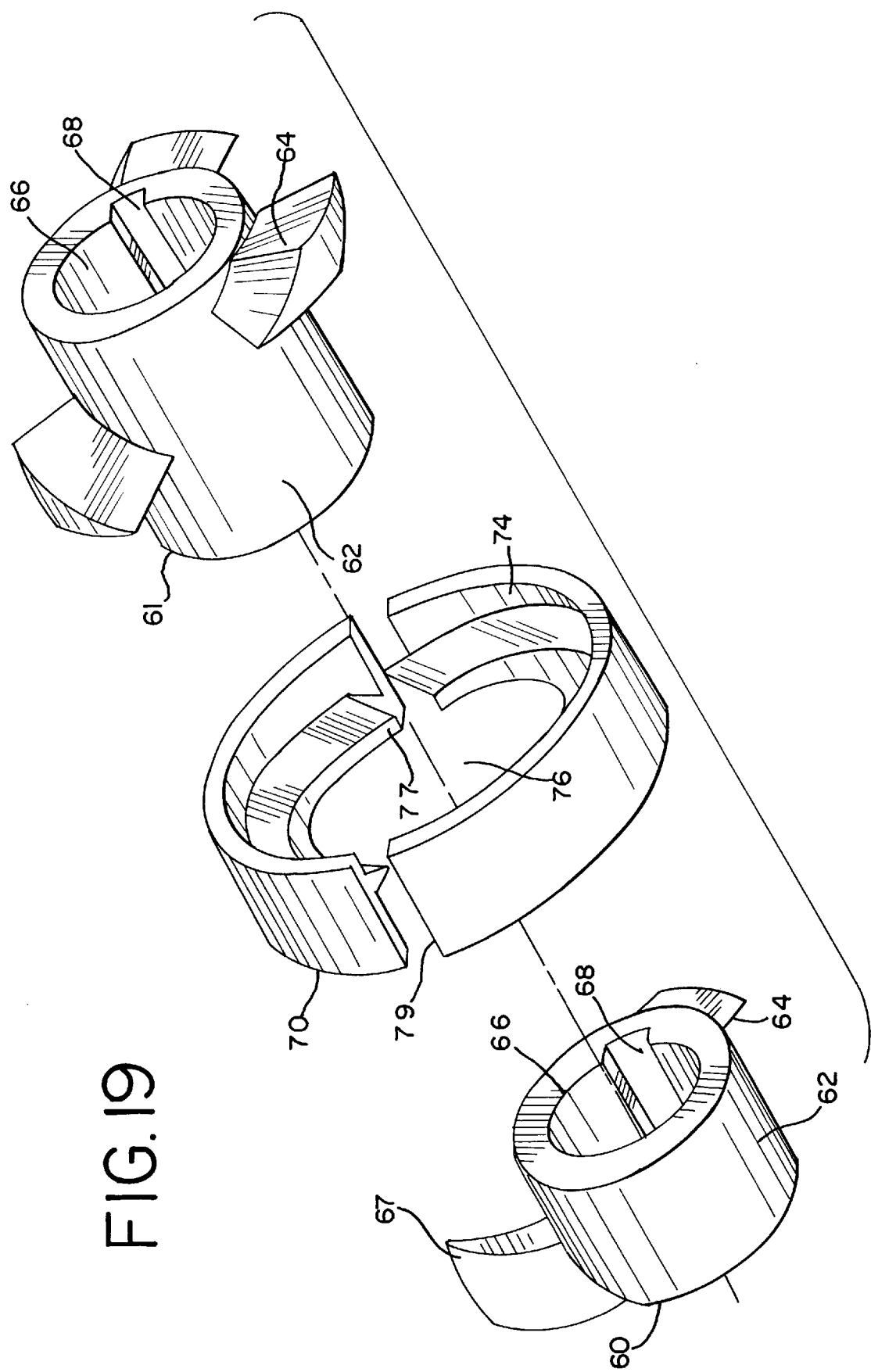

CHEWING GUM BASE MANUFACTURING PROCESS USING PLURALITY OF SOFTENING AGENTS INLETS

CROSS REFERENCE TO RELATED APPLICATIONS

This application is a continuation-in-part of application Ser. No. 08/362,254 filed on Dec. 22, 1994, now U.S. Pat. No. 5,543,160 which is a continuation-in-part of application Ser. No. 08/305,363 filed on Sept. 13, 1994, now abandoned; a continuation-in-part of application Ser. No. 08/141,281 filed on Oct. 22, 1993, now U.S. Pat. No. 5,419,919; and a continuation-in-part of application Ser. No. 08/136,589 filed on Oct. 14, 1993, now U.S. Pat. No. 5,486,366 which is a continuation-in-part of application Ser. No. 08/126,319 filed on Sep. 24, 1993, now U.S. Pat. No. 5,562,936. The disclosure of each of the foregoing documents is hereby incorporated by reference.

FIELD OF THE INVENTION

This invention is directed to a continuous process for the manufacture of chewing gum bases.

BACKGROUND OF THE INVENTION

A typical chewing gum base includes one or more elastomers, one or more fillers, one or more elastomer solvents, softening agents and optional plastic polymers and miscellaneous colors, flavors and antioxidants. Due primarily to the difficulty in melting and dispersing the elastomers homogeneously among the other gum base ingredients, gum base manufacture has typically been a tedious and time-consuming batch process. For example, one such conventional process uses a sigma blade batch mixer having a front to rear blade speed ratio of 2:1, and a mixing temperature of about 80°–125° C.

In this conventional process, initial portions of elastomer, elastomer solvent and filler are added to the heated sigma blade mixer and blended until the elastomer is melted or smeared and thoroughly mixed with the elastomer solvent and fillers. Then the remaining portions of elastomer, elastomer solvent, softening agents, fillers and other ingredients are added sequentially, in a stepwise fashion, often with sufficient time for each stepwise addition to become completely mixed before adding more ingredients. Depending on the composition of the particular chewing gum bases and, in particular, the amount and type of elastomer, considerable patience may be required to insure that each ingredient becomes thoroughly mixed. Overall, anywhere from one to four hours of mixing time can be required to make one batch of chewing gum base using a conventional sigma blade mixer.

After mixing, the molten gum base batch must be emptied from the mixer into coated or lined pans, or pumped to other equipments such as a holding tank or a filtering device, then extruded or cast into shapes, and allowed to cool and solidify, before being ready for use in chewing gum. This additional processing and cooling requires even more time.

Various efforts have been undertaken to try to simplify and reduce the time required for gum base manufacture. European Patent Publication No. 0 273 809, in the name of General Foods France, discloses a process for making nonadhesive chewing gum base by blending elastomer and filler components together in an industrial mill type mixer to form a nonadhesive premix, dividing the premix into fragments, and blending the premix fragments and at least one other nonadhesive gum base component together in a powder mixer. Alternatively, the premix fragments and other base components can be added to an extruder along with other chewing gum components to accomplish direct manufacture of chewing gum.

French Patent Publication No. 2 635 441, also in the name of General Foods France, discloses a process for making a gum base concentrate using a twin screw extruder. The concentrate is prepared by mixing high molecular weight elastomers and plasticizers in desired proportions and feeding them into the extruder. Mineral fillers are added to the extruder downstream of the feed inlet of the elastomer/plasticizer blend. The resulting gum base concentrate has a high level of elastomers. The concentrate can then be mixed with the other gum base ingredients to provide a complete gum base.

U.S. Pat. No. 3,995,064, issued to Ehrgott et al., discloses the continuous manufacture of gum base using a sequence of mixers or a single variable mixer.

U.S. Pat. No. 4,187,320, issued to Koch et al., discloses a two stage process for preparing a chewing gum base. In the first stage, a solid elastomer, an elastomer solvent, and an oleaginous plasticizer are combined and mixed together under high shear. In the second stage, a hydrophobic plasticizer, a non-toxic vinyl polymer, and an emulsifier are added to the mixture and mixed using high shear.

U.S. Pat. No. 4,305,962, issued to Del Angel, discloses an elastomer/resin masterbatch formed by mixing a finely ground ester gum resin with a latex elastomer to form an emulsion, coagulating the emulsion using sodium chloride and sulfuric acid, separating the coagulated solid crumbs from the liquid phase, washing the solid crumbs, and removing the excess water.

U.S. Pat. No. 4,459,311, issued to DeTora et al., discloses making gum base using two separate mixers—a high intensity mixer for pre-plasticizing the elastomer in the presence of a filler, followed by a medium intensity mixer for ultimately blending all the gum base components together.

U.S. Pat. No. 4,968,511, issued to D'Amelia et al., discloses that chewing gum can be made directly in a one-step compounding process (without making an intermediate gum base) if certain vinyl polymers are used as the elastomer portion.

Several publications disclose that a continuous extruder can be used to make the ultimate chewing gum product after a separate process has previously been used to make the chewing gum base. These publications include U.S. Pat. No. 5,135,760, issued to Degady et al.; U.S. Pat. No. 5,045,325, issued to Lesko et al., and U.S. Pat. No. 4,555,407, issued to Kramer et al.

Notwithstanding the prior efforts described above, there is a need and desire in the chewing gum industry for a continuous process which can effectively and efficiently be used to make a variety of complete chewing gum bases without limiting the type or quantity of elastomer employed, and without requiring preblending or other pretreatment of the elastomer.

Continuous gum base manufacturing processes, while desirable, present a number of difficulties. One of these is that continuous equipment has a given processing length once set up for operation. This length is limited in practice by what is commercially available, and is often less than what may be desired from the gum base manufacture's standpoint. As a result, continuous mixing operations have less degrees of freedom than traditional batch processes. For example, in a batch process, if longer mixing times are needed, it is a simple matter to continue mixing. However, the residence time in a continuous mixer is a function of the operating speed and feed rates. Therefore, to change the mixing time, some other factor must be adjusted and accommodated. Further, in a batch process, additional ingredients can be added at any time. Commercial continuous mixers have a limited number of feed inlets at fixed positions. Therefore the additional ingredients can be added at only preset points in the mixing process.

Also, in a batch mixer, dispersive and distributive mixing can be independently varied and controlled. On a continuous mixer, changes to one type of mixing will often also affect the other type of mixing. If the amount of the machine used for high shear mixing is increased, there is less machine available for distributive mixing. Also, if the speed is increased, heat may be generated beyond the ability of the cooling capabilities of the equipment.

One of the particular problems that has been encountered during development of continuous gum base manufacturing processes is that the properties of the chewing gum base, particularly the softness of the chew, is a function of the gum base ingredients and the mixing conditions that are applied to those ingredients. However, the mixing conditions are also a function of the gum base ingredients, as well as the type of mixing elements being used, the temperature and viscosity of the ingredients and the fullness of the mixer barrel. Where the gum base includes large amounts of softening agents, particularly fats and oils, it becomes difficult to incorporate all of the softening agents into the gum base in a continuous mixer where the residence time is limited and changes in one aspect of the mixing compromise other aspects.

SUMMARY OF THE INVENTION

It has been discovered that one way to control the mixing process, yet at the same time provide all of the ingredients desired in the chewing gum base, is to add the softening agents at a plurality of feed inlet locations in the continuous mixing process.

In one aspect, the invention is a process for continuously producing a chewing gum base comprising the steps of continuously adding chewing gum base ingredients, including a hard elastomer, filler and one or more lubricating agents comprising a softening agent into a continuous mixer having a plurality of spatially separated feed inlets, a portion of the softening agent being introduced into the mixer through a first feed inlet and a portion of the softening agent being introduced into the mixer through a second feed inlet located downstream of the first feed inlet; subjecting the chewing gum base ingredients to continuous mixing operations within the mixer, thereby producing a chewing gum base; and continuously discharging the chewing gum base from the mixer while chewing gum base ingredients continue to be introduced and mixed within the mixer.

In a second aspect, the invention is a process for continuously producing a chewing gum base comprising the steps of continuously adding chewing gum base ingredients, including a hard elastomer, filler and one or more lubricating agents comprising a softening agent, into a continuous mixer having a plurality of spatially separated feed inlets, high shear mixing elements and low shear mixing elements downstream from the high shear mixing elements, at least a portion of the hard elastomer, at least a portion of the filler and a portion of the lubricating agents being introduced into the mixer through one or more feed inlets located at or before the high shear mixing elements and a portion of the softening agent being introduced into the mixer through a first feed inlet and a portion of the softening agent being introduced into the mixer through a second feed inlet located downstream of the first feed inlet; subjecting the chewing gum base ingredients to continuous mixing operations within the mixer, thereby producing a chewing gum base; and continuously discharging the chewing gum base from the mixer while chewing gum base ingredients continue to be introduced and mixed within the mixer.

The invention has numerous advantages. First, chewing gum base is produced in a continuous process. If desired, the output can be used to supply a continuous chewing gum production line or, if sufficient mixing can be accomplished in the first part of the mixer, the complete chewing gum can be produced in one mixer. Second, the average residence time for gum base ingredients is reduced from hours to minutes. Third, all of the necessary addition and gum base compounding steps can be performed in sequence, preferably using a single continuous mixing apparatus. Fourth, the preferred embodiment provides improved metering and mixing of intermediate and low viscosity gum base ingredients by adding these ingredients in the liquid state under pressure. Fifth, the invention is effective for a wide range of gum base compositions, including different gum base elastomers and elastomer percentages, without requiring preblending or other pretreatment of the elastomers. Sixth, the gum base can be produced on demand, eliminating finished base inventory. This allows maximum flexibility to react to market demands and formula changes. Seventh, high quality gum bases, including those containing high levels of fats, oil and/or low melting point waxes, can be made on a continuous basis.

The foregoing and other features and advantages of the invention will become further apparent from the following detailed description of the presently preferred embodiments, read in conjunction with the accompanying examples and drawings.

BRIEF DESCRIPTION OF THE DRAWINGS

FIG. 10b is a front view of the feed element of FIG. 10a.

FIG. 11b is a front view of the forward helical mixing paddle of FIG. 11a.

FIG. 12b is a front view of the reverse helical mixing paddle of FIG. 12a.

FIG. 16 is a schematic illustration of two paddle mixers arranged in series.

FIG. 19 is a perspective view showing the relative positioning of the elements of FIGS. 18a, 18b and 18c in the high efficiency mixer of FIG. 17.

DETAILED DESCRIPTION OF THE DRAWINGS AND PREFERRED EMBODIMENTS OF THE INVENTION

Figure 1:
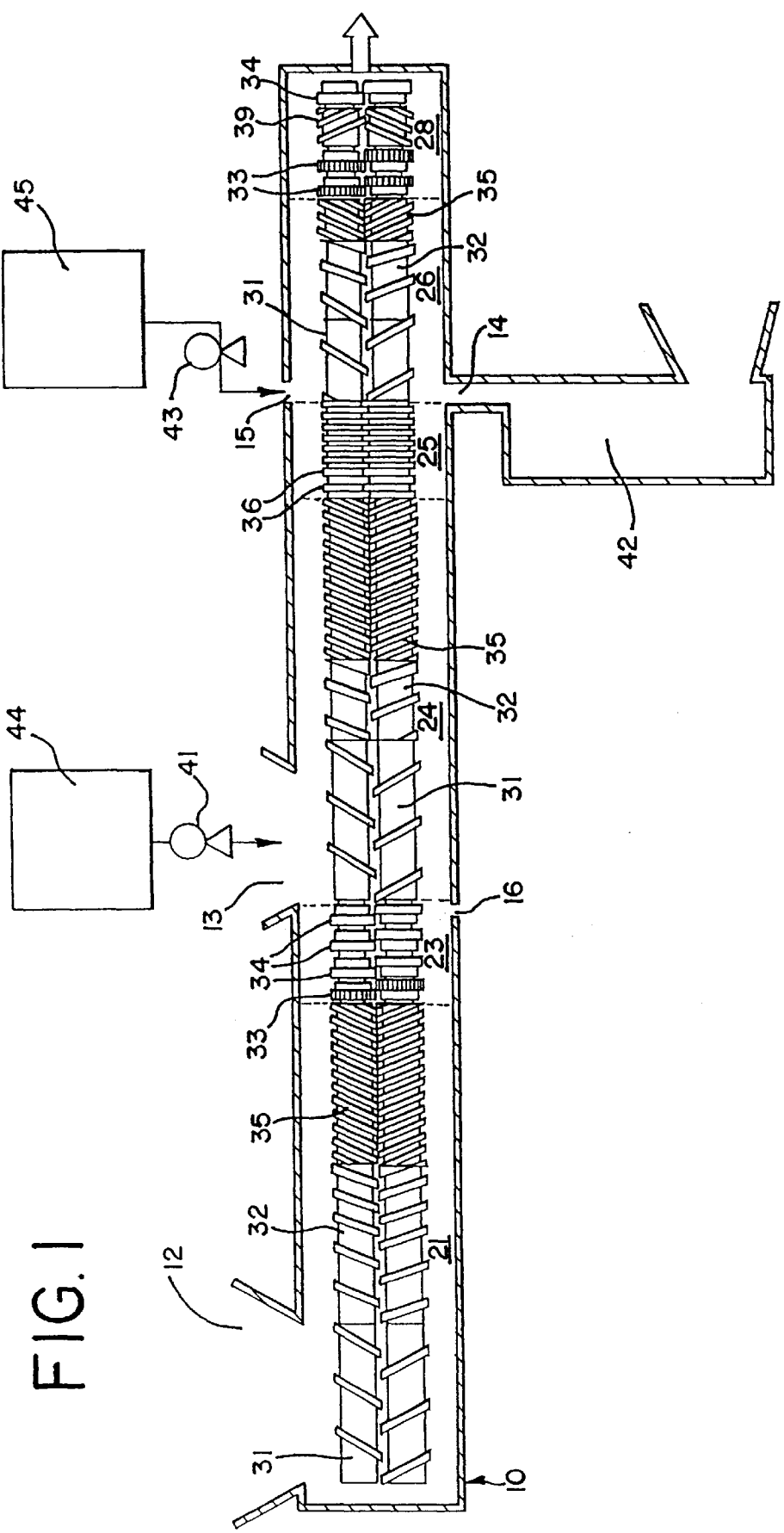
FIG. 1 depicts a schematic representation of a twin screw extruder set up for use in practicing the present invention.

As noted earlier, gum base ingredients play a functional role during both mixing of the gum base and in the final chew characteristics of the chewing gum made from the base. During high shear, dispersive mixing, the filler acts to increase the shear. Some of the other gum base ingredients act as lubricating agents, reducing the shear. Most elastomer solvents, soft elastomers, plastic polymers and softening agents generally act as lubricating agents in continuous gum base manufacturing processes. Some lubricating agents such as polyisobutylene and the elastomer solvents cause the elastomer to disentangle, while others are not miscible with the elastomer and act only to lubricate the mixing and shearing operations.

In most cases, fats and/or oils used in continuous processes may be added in one location. However, in many cases there are some advantages in adding fats/oils at multiple locations. Partial addition in the early stages of processing may improve ease of handling of some elastomers in dispersive mixing. Addition in the early stages of distributive mixing can improve mixing of the low viscosity oils into the higher viscosity bases. Multiple locations of fat/oil addition can also effect the final texture of the base and consequently the gum formulation.

Some base formulations require a significant amount of fat/oil, such as some non-tack base formulas. These may contain 20–40% fat. In these situations, there is a significant advantage to using multiple points of addition. The quantity of fat is too much to add at one point, so fat and oil should be added in the early distributive mixing stage and later in this stage to become totally incorporated into the base. Tests have shown that a 35% fat level, base formulation cannot be made unless the fat/oil is added in multiple additions.

The chewing gum base made by the process of the present invention will be the same as bases made by conventional processes, and can thereafter be made into conventional chewing gums, including bubble gum, by conventional methods. The methods of production are well known and therefore not repeated here. Of course, specialized chewing gum, such as nonadhesive chewing gum and bubble gum, will use specialized gum base ingredients. However, those gum base ingredients can be combined using the processes herein described.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, elastomer solvents, softening agents and inorganic fillers. Plastic polymers, such as polyvinyl acetate, which behave somewhat as plasticizers, are also often included. Other plastic polymers that may be used include polyvinyl laurate, polyvinyl alcohol and polyvinyl pyrrolidone.

Elastomers may constitute about 5 to about 95 percent by weight of the gum base, preferably between 10 and 70 percent by weight and most preferably between 15 and 45 percent by weight. Elastomers may include polyisobutylene, butyl rubber (isobutylene-isoprene copolymer), styrene butadiene rubber, polyisoprene and butadiene rubber, as well as natural rubbers such as smoked or liquid latex and guayule, as well as natural gums such as jelutong, lechi caspi, perillo, massaranduba balata, massaranduba chocolate, nispero, rosindinha, chicle, gutta hang kang or mixtures thereof.

Elastomer used in chewing gum base can generally be categorized as hard elastomers or soft elastomers. Hard elastomers, which are most commonly butyl rubber and styrene butadiene rubber, generally have a high molecular weight, typically a Flory molecular weight over 200,000. A typical butyl rubber used in chewing gum base has a Flory molecular weight of about 400,000. Hard elastomers are those which require high shear, dispersive mixing to be utilized in chewing gum base. Hard elastomers generally do not flow at room temperature, even over an extended period of time, and are not pumpable even when heated to temperatures just below which substantial degradation occurs.

Soft elastomers have a lower molecular weight, typically a Flory molecular weight under 100,000. Polyisobutylene and polybutadiene are typically soft elastomers. A typical polyisobutylene used in chewing gum base has a Flory molecular weight of about 53,000. Soft elastomers are generally pumpable at temperatures normally used to make chewing gum base, and will flow at room temperature, though often very slowly.

In addition to Flory molecular weight, sometimes a Stodinger molecular weight is specified. Stodinger molecular weights are generally ⅓ to ⅕ of Flory molecular weights. For example, the polyisobutylene having a Flory molecular weight of 53,000 has a Stodinger molecular weight of about 12,000. Sometimes number average or weight average molecular weights are reported, or the measurement method is not reported. In such instances, the above recitation of the functionality of the elastomer and how they are mixed in producing the chewing gum base can generally be used to classify the elastomer as hard or soft.

Elastomer solvents may constitute from about 0 to about 75 percent by weight of the gum base, preferably 5 to 45 percent by weight and most preferably 10 to 30 percent by weight. Elastomer solvents include natural rosin esters such as glycerol ester of wood rosin, glycerol ester of partially hydrogenated rosin, glycerol ester of polymerized rosin, glycerol ester of partially dimerized rosin, glycerol ester of rosin, pentaerythritol esters of partially hydrogenated rosin, methyl and partially hydrogenated methyl esters of rosin, pentaerythritol ester of rosin, resin ester of glycerol abietate or mixtures thereof. Elastomer solvents also include synthetics such as terpene resins derived from alpha-pinene, beta-pinene and/or d-limonene.

Softening agents include oils, fats, waxes and emulsifiers. Fats and oils used in chewing gum bases are not only materials like vegetable oils such as soybean and cottonseed oils, hydrogenated and partially hydrogenated vegetable oils, animal fats like lard and tallow, cocoa butter, coconut oil, palm oil and palm kernel oil, but also modified lipids such as those that contain fatty acids such as capric, caprylic, lauric, stearic, and oleic acids, and mono, di and triglycerides of these fatty acids. Some of the fats and oils are medium chain triglycerides (called captrin).

Commonly employed waxes include polywax, paraffin, microcrystalline and natural waxes such as candelilla, beeswax and carnauba. Paraffin waxes may be considered to be plasticizers. Microcrystalline waxes, especially those with a high degree of crystallinity, may be considered as bodying agents or textural modifiers.

Emulsifiers, which also sometimes have plasticizing properties, include glycerol mono and distearate, lecithin, mono and diglycerides of fatty acids, triacetin, acetylated monoglyceride, polyglycerol esters, glycerol triacetate and carbohydrate polyesters.

The gum base typically also includes a filler component. The filler component may be calcium carbonate, magnesium carbonate, talc, dicalcium phosphate or the like. The filler may constitute between about 5 and about 60 percent by weight of the gum base. Preferably, the filler comprises about 5 to about 50 percent by weight of the gum base.

Further, gum bases may also contain optional ingredients such as antioxidants, colors and flavors.

The temperature attained in the mixer often varies over the length of the mixer. The peak temperature in the dispersive mixing zone where high shear mixing elements are located, will preferably be over 175° F., more preferably over 250° F. and most preferably over 300° F., and even 350° F. for some gum base manufacturing processes.

The insoluble gum base may constitute between about 5 to about 80 percent by weight of the gum. More typically the insoluble gum base comprises between 10 and 50 percent by weight of the gum and most often about 20 to about 35 percent by weight of the gum.

The water soluble portion of the chewing gum may include softeners, bulk sweeteners, high intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5–15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5–95% by weight of the chewing gum, more typically 20–80% by weight of the chewing gum and most commonly 30–60% by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present and are commonly used with sugarless sweeteners. When used, high intensity sweeteners typically constitute between 0.001–5% by weight of the chewing gum, preferably between 0.01–1% by weight of the chewing gum. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may provide additional sweetness such as with aqueous sugar or alditol solutions.

Flavor should generally be present in the chewing gum in an amount within the range of about 0.1–15% by weight of the chewing gum, preferably between about 0.2–5% by weight of the chewing gum, most preferably between about 0.5–3% by weight of the chewing gum. Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used in the flavor ingredient of the invention. Natural and artificial flavoring agents may be combined in any sensorially acceptable fashion.

Optional ingredients such as colors, emulsifiers, pharmaceutical agents and additional flavoring agents may also be included in chewing gum.

The preferred process of the present invention may be carried out with a variety of continuous mixing equipment. In some embodiments of the invention, more than one piece of continuous mixing equipment will be coupled in series. As used in the claims, the term "a continuous mixer" means one mixer or a plurality of mixers in series. Three specific types of continuous mixing equipment are described in detail below and are shown in the attached drawings: twin screw extruders, paddle mixers and blade-and-pin mixers, which are specialized single screw extruders. Extruders are preferred for use in the present invention, particularly the blade-and-pin mixer.

A. Twin Screw Extruders

In one embodiment, the invention may be carried out on a twin screw extruder such as depicted schematically in FIG. 1. The twin screw extruder used to practice the preferred embodiment of the invention will be set up with several different feed inlet locations where chewing gum base ingredients can be added. The screws inside the barrel of the extruder are equipped with different types of elements along the length of the screws. The different mixing zones are sometimes referred to as processing zones, and described by the type of elements employed in the zones. The barrel is typically made up of different sections. These sections may be heated or cooled independent of other sections. Heating and cooling is thus typically done by region of the extruder barrel, which generally coincides with the barrel sections. These regions of heating or cooling may or may not coincide with processing zones, depending on the lengths of the barrel sections and the elements in the processing zones.

While different equipment manufacturers make different types of elements, the most common types of elements include conveying elements, compression elements, reverse conveyance elements, homogenizing elements such as shearing disks and toothed elements, and kneading disks and blocks. Conveying elements generally have flights spiraling along the elements with wide gaps between the flights. These elements are used at feed inlet zones to quickly move material into the body of the extruder. Compression elements have flights with a pitch that narrows as the material moves along the flights. This results in compression and high pressure in the forward direction, which is required to force material downstream and through the other elements. Reverse conveyance elements have flights that are angled opposite those of the conveying elements. The flights rotate in a direction that would force material upstream. These elements provide a high back pressure and slow down movement of the material through the extruder. Of course, the extruded material still works its way opposite the flights to move downstream through the reverse elements. A reverse helical arrangement of kneading blocks can accomplish a similar result.

Figure 2:
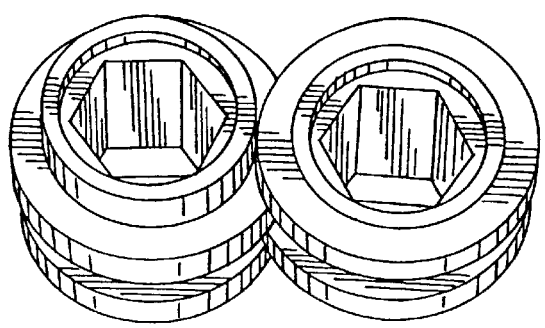
FIG. 2 depicts a set of shearing disks used in the extruder of FIG. 1.
Figure 3:
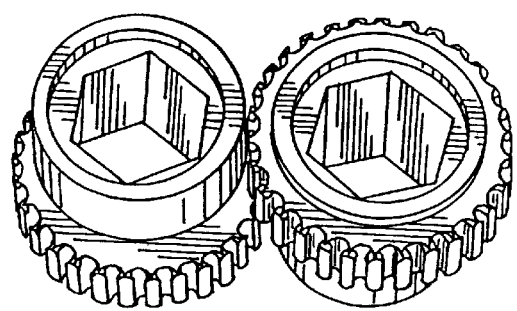
FIG. 3 depicts a set of toothed elements used in the extruder of FIG. 1.
Figure 4:
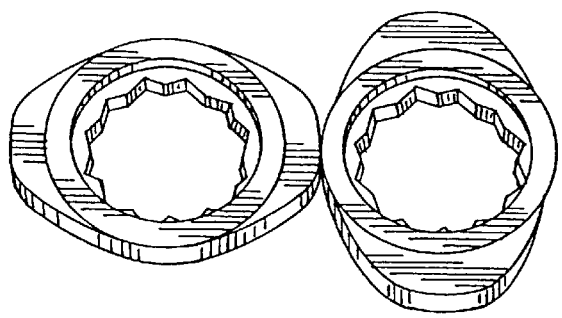
FIG. 4 depicts a set of kneading disks used in the extruder of FIG. 1.
Figure 5:
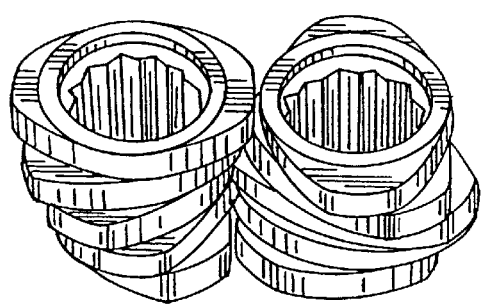
FIG. 5 depicts a plurality of kneading disks, set up in a helical fashion, to form kneading blocks.

Shearing disks, as their name implies, impart high shearing forces on the material in the extruder, resulting in highly dispersive mixing. In a twin screw extruder, the shearing disks opposite one another on the two different screws have close fitting disk/slot elements, as depicted in FIG. 2. Toothed elements, as depicted in FIG. 3, have gear-like teeth that oppose a cylindrical spacer shaft on the other screw. Toothed elements impart highly distributive mixing. Often the toothed elements are made in matched sets, with a cylindrical shaft portion and a toothed portion as one unit. Kneading disks, as shown in FIG. 4, have an elliptical shape, and produce a kneading action in the material passing through the extruder. Often a plurality of kneading disks will be placed next to each other in a helical arrangement, as shown in FIG. 5, referred to as kneading blocks.

Highly distributive mixing can also be accomplished using reverse conveyance elements that have portions missing from the flights to allow flow counter to the direction of compression. These missing portions may be arranged as a groove through the flights cut parallel to the length of the element. Also, kneading blocks followed by reverse conveyance elements, to build up high back pressure, also produce highly distributive mixing.

Mixing-restriction elements produce a high back pressure and some mixing without overly restricting throughput. For this reason, nozzles or orifices are not suitable as mixing-restriction elements. As noted above, reverse conveyance elements provide back pressure, and are thus mixing-restriction elements. Shearing disks, like those shown in FIG. 2, also produce a high back pressure and are thus another example of a mixing-restriction element.

The high back pressure is important so that other elements, such as those that produce highly distributive or highly dispersive mixing, will be able to function properly. Thus in the preferred embodiment of the invention, mixing-restriction elements are used after each mixing zone. It is most preferable to use a mixing-restriction element just prior to the gum base exiting the extruder.

These various types of elements, and other elements useful in twin screw extruders, are well known in the art and are commercially available. The elements are often specifically designed for the different types of commonly available twin screw extruders, which include co-rotation, counter rotation, intermeshing and tangential twin screw extruders. Elements intended for similar functions will vary in design depending on the type of extruder for which they are intended.

One specific type of element for a specific brand of extruder is a non-intermeshing polygon element sold by the Farrel Corporation, 25 Main Street, Ansonia, Conn. 06401, for the Farrel-Rockstedt co-rotating twin screw extruder. It is believed that the non-intermeshing polygons produce dispersive mixing.

In preferred embodiments of the invention, the dispersive mixing disentangles the elastomers with a minimum amount of degradation of the polymer chains. Thus, while dispersive mixing will inevitably reduce the molecular weight of the polymer, it is preferable to control the dispersive mixing operation to minimize this molecular weight reduction. Preferably, the average molecular weight will not be reduced below the average molecular weight of the same polymers mixed into gum base using conventional processes.

An adequate dispersive mixing will produce a smooth, rubbery fluid, with no detectable lumps of rubber. If only a few lumps of rubber are present they may be screened out or dispersed during subsequent mixing steps. However, if the number or size of lumps is excessive, or the processed elastomers and fillers are in the form of an agglomeration or grainy mass, the dispersive mixing applied is inadequate.

The distributive mixing should be sufficient to produce a homogeneous gum base, rather than a material that appears to be "sweating", or that has a marbled or swiss cheese texture. In the preferred embodiment of the invention, the highly distributive mixing is sufficient to incorporate softening agents, particularly fats, oils and waxes, to the same degree these softening agents are incorporated in conventional chewing gum base manufacturing processes.

As shown in FIG. 1, for practicing an embodiment of the invention, a twin screw extruder 10 is set up with a first feed inlet location 12 adjacent a first processing zone 21 fitted with conveying elements 31, conveying and compression elements 32 and compression elements 35. The second processing zone 23 is equipped with a combination of toothed elements 33, as depicted in FIG. 3, and several sets of shearing disks 34, as depicted in FIG. 2. At the end of the second processing zone 23 the extruder 10 is equipped with a port 16 which is connected to a vacuum source (not shown). The third processing zone 24 contains additional conveying elements 31, conveying and compression elements 32 and compression elements 35. A second feed inlet 13 is provided in the extruder adjacent this second set of conveying elements 31, for feeding additional gum base ingredients into the third processing zone 24. Feed inlet 13 allows for the addition of powdered ingredients as well as liquid ingredients from pump 41. The fourth processing zone 25 is fitted with kneading disks 36. At the beginning of the fifth processing zone 26, the twin screw extruder 10 has another inlet 15 connected to a pump 43 and a feed inlet 14 in the form of a port connected to a side feeder 42, which may be a single or twin screw extruder, or even a gear pump which can generate high pressure. The fifth processing zone 26 is fitted with conveying elements 31, conveying and compression elements 32 and compression elements 35, which force the gum base ingredients into the sixth and final processing zone 28. Zone 28 contains two sets of toothed elements 33, followed by reverse elements 39 and shearing disks 34. After passing through the shearing disks 34, the gum base ingredients exit the extruder 10.

It may be preferable to heat some of the ingredients, either to melt them or to lower their viscosity. As shown in FIG. 1, the extruder 10 may be set up with heated tanks 44 and 45, connected respectively to pumps 41 and 43, for this purpose. Other commonly used equipment, such as equipment to monitor the temperature and heat or cool the extruder, is not shown in FIG. 1. The equipment will also include conventional weighing and feeding devices for continuously adding granulated or powdered ingredients. All of the ingredients are preferably fed into the extruder by equipment that is controlled to operate at a steady state; although during startup it may be preferable to start feeding some ingredients before others, and to feed the ingredients in at different rates than those desired for steady-state operation.

It will be understood that FIG. 1, as a schematic representation, shows the various components in their respective order from the standpoint of flow through the extruder 10. Typically the screws are mounted in a horizontal side-to-side position and feed inlets, especially those open to the atmosphere like the inlet 12 and 13, are placed vertically above the screws.

While the arrangement of FIG. 1 is preferred for particular gum bases, other arrangements may be preferred for other gum bases. FIG. 1 depicts an extruder with three general areas of ingredient addition and six processing zones. For some gum bases, two, four or more ingredient feeding zones may be used, with different numbers of processing zones. FIG. 1 also depicts the use of one set each of long conveying elements 31, conveying and compression elements 32 and compression elements 35 in the first processing zone 21, a short set of conveying and compression elements 32 in zones 24 and 26, and a short set of conveying elements 31 and compression elements 35 in zone 26. In reality, one, two or more elements of different types and length may be used in these zones. FIG. 1 also depicts one set of toothed elements 33 and three sets of shearing disks 34 in zone 23, but different numbers of these elements, or different elements all together, may be used. Likewise in zones 25 and 28, different types of elements that produce distributive mixing may be used, dependent on the gum ingredients being mixed in those zones and the type of extruder being used.

Figure 6A:
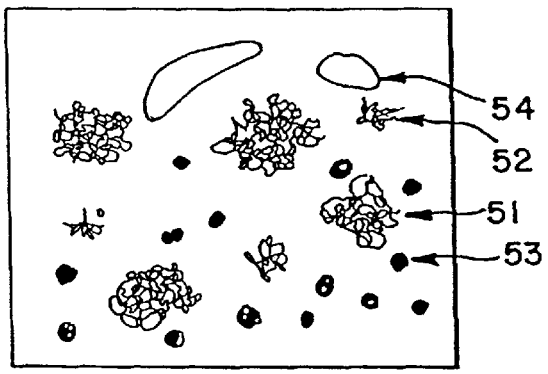
FIGS. 6a–e depict schematic sequential representations of gum base ingredients during the mixing process.
Figure 6B:
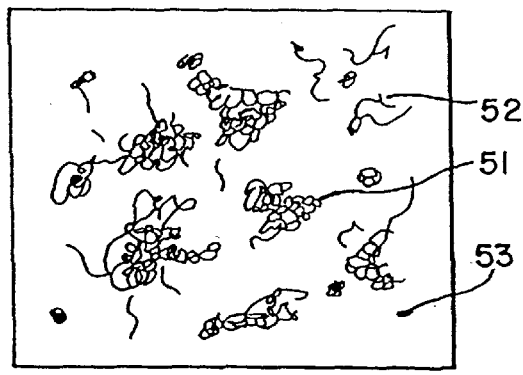
Figure 6C:
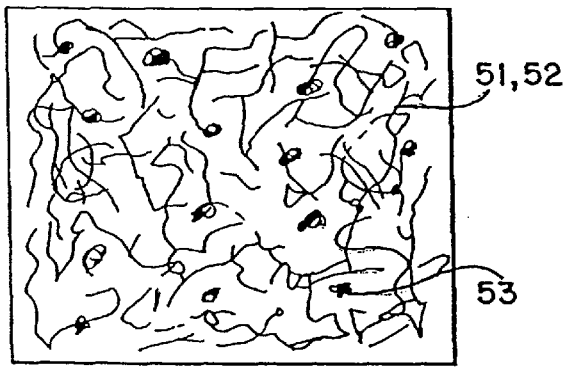

FIGS. 6a–e represent the state of various gum base ingredients as they are compounded into chewing gum base. At the beginning, as shown in FIG. 6a, the high molecular weight (hard) elastomer 51 and medium molecular weight elastomer 52 are both in the form of granules or particles in which the elastomer molecules are tightly bound together. The filler 53 is in particulate form, but may not be homogeneously mixed with the elastomers 51 and 52. The elastomer solvent 54 may be present in the form of droplets. As mixing begins, depicted in FIG. 6b, the elastomer solvent 54 becomes associated with the elastomers 51 and 52. With the presence of the filler 53, elastomer solvent 54 and heat, the granules begin to come apart into individual elastomer molecules. Also, the filler 53 becomes more evenly distributed, and may have its particle size reduced. As the process continues, the elastomers 51 and 52 become disentangled, as shown in FIG. 6c. This disentangling is the result of subjecting the elastomers 51 and 52 to highly dispersive mixing.

Figure 6D:
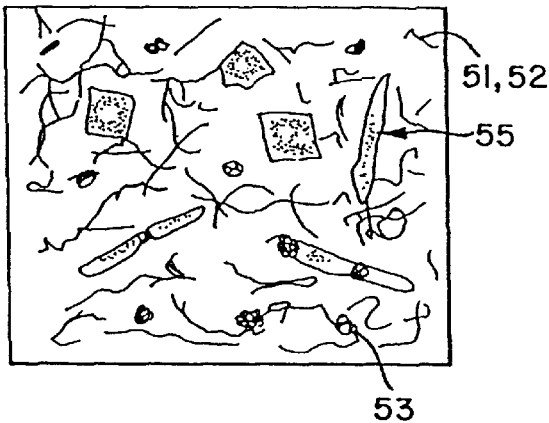
Figure 6E:
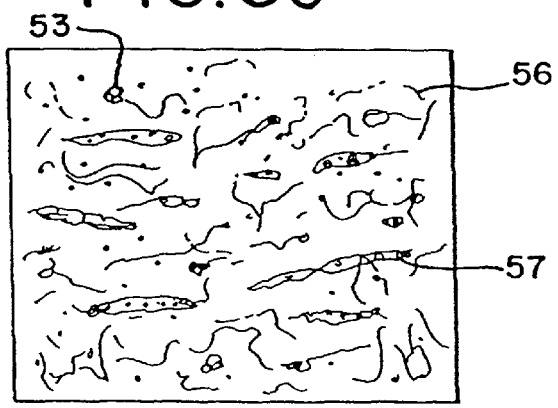

After this step, the lower viscosity ingredients, such as polyvinyl acetate 55, may be added, as shown in FIG. 6d. Initially, this material will also be in discrete particles, or droplets as it melts. Further mixing and further ingredient additions, such as waxes 56 and emulsifiers 57, are subjected to distributive mixing, as depicted in FIG. 6e. Continued highly distributive mixing produces a homogeneous chewing gum base, wherein discrete particles or droplets are not detectable by sensory perception.

The elastomer may be added at the first feed inlet 12 along with elastomer solvent such as resins and the filler. However, especially lower weight elastomers may be added at least partially at the second feed inlet 13. Portions of the filler may also be added at the second feed inlet 13. Polyvinyl acetate may be added via a powder feeder or the single screw extruder 42, or a twin screw extruder or gear pump, at the feed inlet port 14, while melted fats and waxes and oils are added at the last feed inlet 15. This will result in the filler, elastomer and some lubricating agents being subjected to highly dispersive mixing first before lower viscosity ingredients are added. The toothed elements 38, reverse elements 39 and shearing disk 40 after feed inlet 15 result in highly distributive mixing of all of the low viscosity gum base ingredients with the other gum base ingredients.

A preferred small scale extruder is a model LSM 30.34 counter-rotational, intermeshing and tangential twin screw extruder from Leistritz, Nrenberg, Germany. Other acceptable twin screw extruders include the Japan Steel Works Model TEX30HSS32.5PW-2V intermeshing co- and counter-rotating twin screw extruder, also known as the Davis Standard D-Tex Model, distributed by Crompton & Knowles Corporation, #1 Extrusion Dr., Pawcatuck, Conn. 06379, and either the co-rotating or counter-rotating intermeshing twin screw extruders from Werner & Pfleiderer Corporation, 663 E. Crescent Ave., Ramsey N.J. 07446. It is preferred to have a long barrel length. A Werner & Pfleiderer co-rotational twin screw extruder can go up to a length to diameter (L/D) ratio of 48. The Japan Steel Works Model TEX30HSS32.5PW-2V extruder may be equipped to have an L/D of 58.

B. Paddle Mixers

Figure 8:
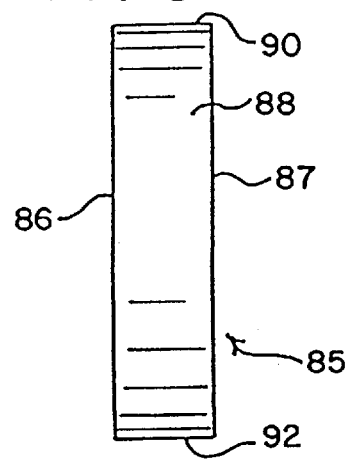
FIG. 8 is a side view of the mixing paddle of FIG. 1.
Figure 7:
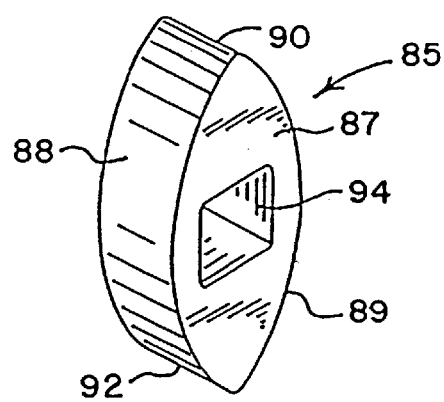
FIG. 7 is a perspective view of a single flat mixing paddle as used in practicing another embodiment of the invention.

Another type of continuous mixer that may be used to practice the present invention is a paddle mixer. A mixing paddle 85 having a flat (non-helical) configuration is shown in FIGS. 7–9. The term "mixing paddle" is defined herein as a four-sided mixing element having two flat surfaces 86 and 87, and two concave surfaces 88 and 89. The flat surfaces are parallel to each other and intersect only the concave surfaces. The concave surfaces oppose each other and intersect each other at two lines 90 and 91. A non-circular (preferably square) opening 94 passes through the center of each mixing paddle 85, in a direction perpendicular to the flat surfaces 86 and 87, and intersects both flat surfaces. The openings 94 are used for mounting a plurality of paddles on rotating shafts, in a predetermined sequence (FIG. 13).

Referring to FIGS. 9a–d, the mixing paddles 85 can be positioned on a shaft at the same or different rotational angles relative to each other. For purposes of the following description, the "No. 1 position" is defined pursuant to FIG. 9a, wherein a straight line drawn on the flat surface 87 and intersecting the lines 90 and 92 coincides with a reference line (for example, a vertical line). The "No. 2 position" is defined pursuant to FIG. 9b, wherein a straight line drawn on the flat surface 87 and intersecting the lines 90 and 92 is 45 degrees counter-clockwise from the reference line. The "No. 3 position" is defined pursuant to FIG. 9c, wherein a straight line drawn on the flat surface 87 and intersecting the lines 90 and 92 is 90 degrees counter-clockwise from the reference line. The "No. 4 position" is defined pursuant to FIG. 9d, wherein a straight line drawn on the flat surface 87 and intersecting the lines 90 and 92 is 135 degrees counter-clockwise from the reference line.

Figure 9A:
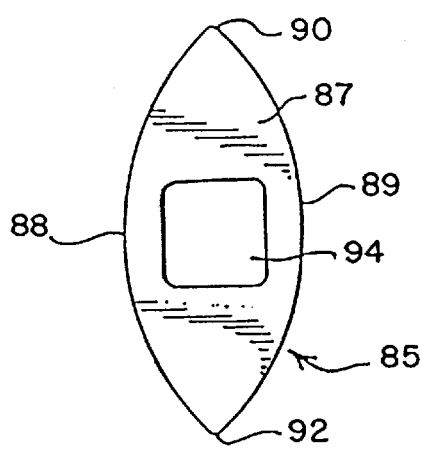
FIG. 9a is a front view of the mixing paddle of FIG. 7, shown at zero degrees rotation (referred to as the no. 1 position).
Figure 9B:
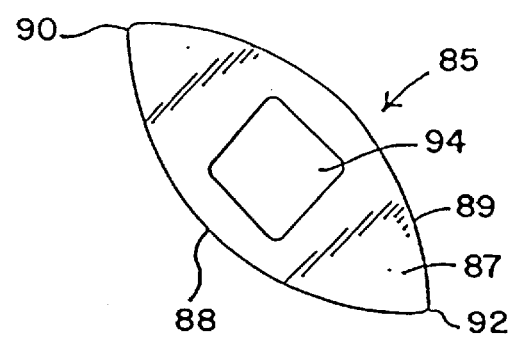
FIG. 9b is a front view of the mixing paddle of FIG. 7, shown at 45 degrees counter-clockwise rotation (referred to as the no. 2 position).
Figure 9C:
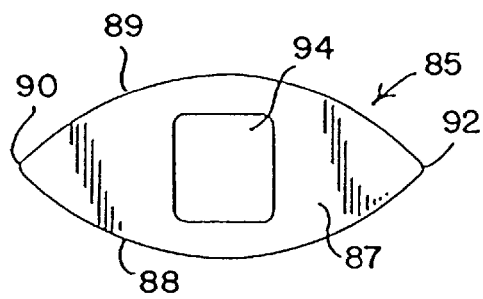
FIG. 9c is a front view of the mixing paddle of FIG. 7, shown at 90 degrees counter-clockwise rotation (referred to as the no. 3 position).
Figure 9D:
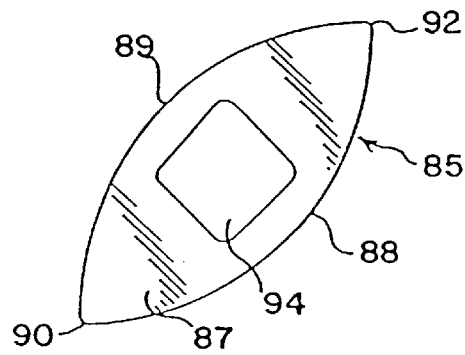
FIG. 9d is a front view of the mixing paddle of FIG. 1, shown at 135 degrees counter-clockwise rotation (referred to as the no. 4 position).

Because the paddles 85 in FIGS. 9a–d are symmetrical, there is no need to further define the relative rotational positions of the paddles for angles of 180, 225, 270 and 315 degrees from the reference line. For example, a paddle having a rotational position of 180 degrees coincides exactly with a paddle having a rotational angle of zero (FIG. 9a). Similarly, a paddle having a rotational angle of 225 degrees coincides exactly with a paddle having a rotation angle of 45 degrees (FIG. 9b); a paddle having a rotational angle of 270 degrees coincides exactly with a paddle having a rotational angle of 90 degrees (FIG. 9c), and a paddle having a rotational angle of 315 degrees coincides exactly with a paddle having a rotational angle of 135 degrees (FIG. 9d).

Figures 13, 14:
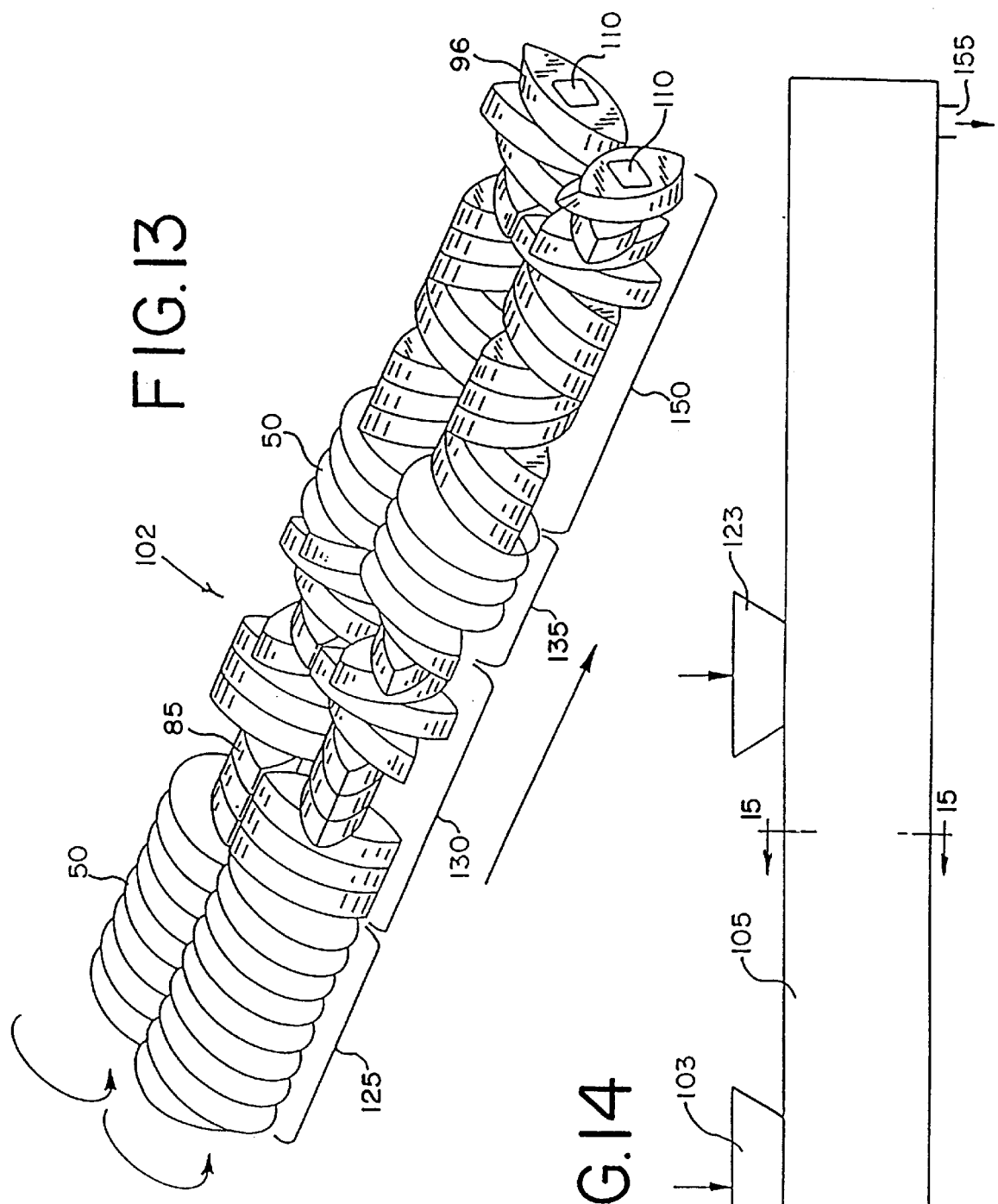
FIG. 13 is a perspective view of an overall paddle mixing configuration of a paddle mixer.
FIG. 14 is a schematic illustration of a barrel and feeder arrangement which can be used in conjunction with the paddle mixer configuration shown in FIG. 13.

It is also understood that each mixing paddle 85 will be in constant rotation during operation of the paddle mixer, due to the rotation of the shafts supporting the paddles (FIG. 13). For purposes of describing the mixing paddles in terms of relative rotational positions (i.e. relative to each other) as explained above, the reference line should be deemed to rotate as the paddles rotate. For example, if the mixing paddles shown in FIGS. 9a–d are positioned sequentially on a single shaft, and if the shaft is rotated 90 degrees, then the chosen reference line, initially vertical, would rotate to a horizontal position. In other words, the relative rotational positions of the mixing paddles in FIGS. 9a–d, defined respectively as 1-2-3-4, will not change during operation of the paddle mixer.

Figure 10A:
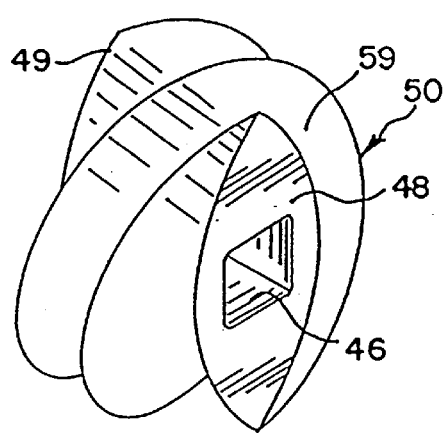
FIG. 10a is a perspective view of a feeding element (not a paddle element) used in the feed areas of a paddle mixer.
Figure 10B:
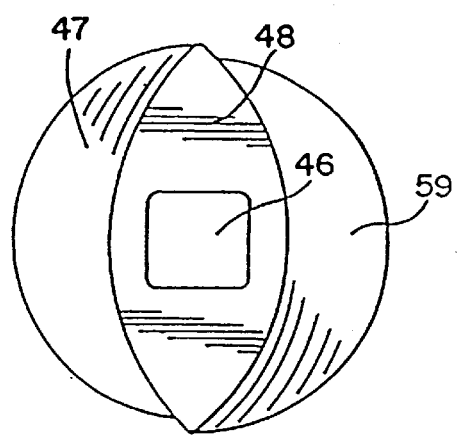

Referring to FIGS. 10a and 10b, the method of the invention also provides for the use of a minor portion of non-paddle elements known as forward conveying or feed elements 50. Each feed element 50 has a flat front surface 48, a flat back surface 49 parallel to the front surface, and a non-circular (preferably square) opening 46 perpendicular to and intersecting the front and back surfaces. However, unlike the mixing paddles described above, the feed elements do not have two concave surfaces intersecting at two lines. Instead, each feed element 50 includes portions of two alternating helical channels 47 and 59. The helical channels are more apparent in FIG. 13 wherein a plurality of feed elements 50 are combined in sequence on the rotating shafts 110 to form feed zones in the mixer. The primary purpose of the feed elements 50 is to convey chewing gum base ingredients forward to the regions of the mixer where paddle mixing takes place.

Figure 11A:
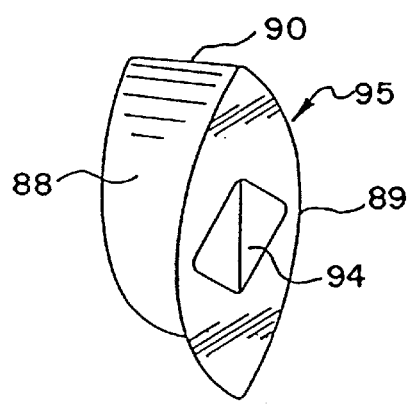
FIG. 11a is a perspective view of a forward helical mixing paddle which can be used in a paddle mixer.
Figure 11B:
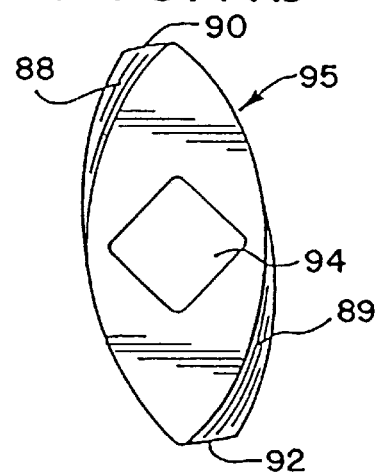

Referring to FIGS. 11a and 11b, a type of mixing paddle known as a forward helical paddle 95 can also be used with the method of the invention. When used, the forward helical paddle 95 imparts a slight forward conveying action while mixing the gum base ingredients. Like the flat mixing paddles 85, each forward helical paddle 95 has two flat surfaces and two concave surfaces 88 and 89. The flat surfaces are parallel to each other and intersect only the concave surfaces. The concave surfaces oppose each other and intersect at two lines 90 and 92. Again, a non-circular (preferably square) opening 94 passes through the center of each mixing paddle 95 and intersects both flat surfaces.

The difference between the forward helical paddle 95 and the flat mixing paddle 85 is that, in the flat mixing paddle 85, the lines 90 and 92 (defining the intersections of concave surfaces 88 and 89) are parallel to each other as shown in FIG. 8. In the forward helical paddle, the line 90 has been rotated counter-clockwise with respect to the line 92 so that the lines are no longer parallel, as shown in FIG. 11b. Similarly, the line 92 has been rotated clockwise with respect to the line 90. The effect of this rotation is to bend the concave surfaces 88 and 89 so that these surfaces have a mildly helical configuration.

Figure 12A:
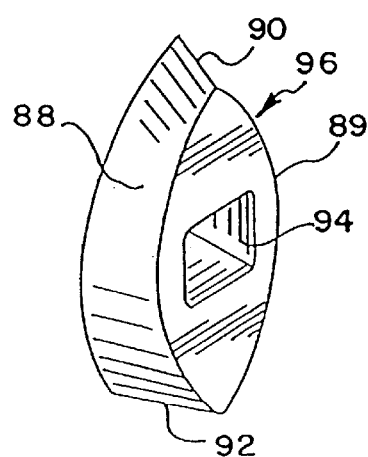
FIG. 12a is a perspective view of a reverse helical mixing paddle which can be used in a paddle mixer.
Figure 12B:
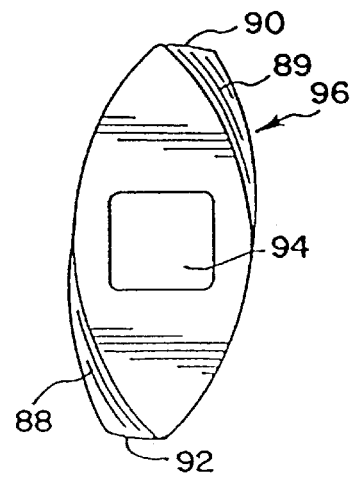

Referring to FIGS. 12a and 12b, a type of mixing paddle known as a reverse helical paddle 96 can also be used with the method of the invention. When used, the reverse helical paddle 96 imparts a slight resistance to forward conveying of the gum base ingredients while mixing the ingredients. This causes a locally higher degree of mixer fill and slight elevation in pressure, in the vicinity of the reverse helical paddle 96.

The reverse helical paddle 96 is configured in the same fashion as the forward helical pattern 95 discussed above, except that the lines 90 and 92 (defining the intersections of concave surfaces 88 and 89) are rotated in the opposite directions. Referring to FIG. 12a, the line 90 has been rotated clockwise with respect to the line 92, and the line 92 has been rotated counter-clockwise with respect to the line 90. The effect of this rotation is to bend the concave surfaces 88 and 89 so that these surfaces have a mild reverse helical configuration.

Figure 11C:
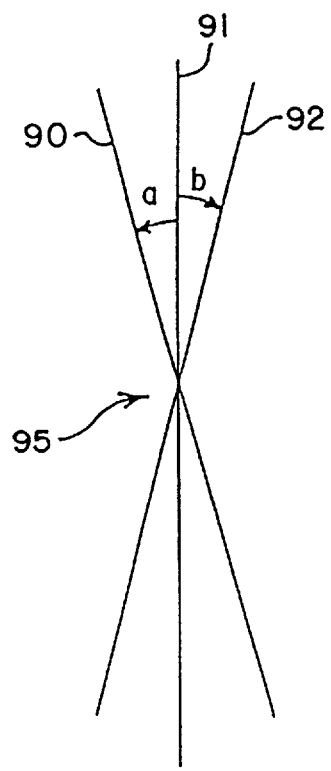
FIG. 11c is based on a top view of the forward helical mixing paddle of 11a, showing only the top intersection line 92 superimposed over the bottom intersection line 90, and a reference line 91.
Figure 12C:
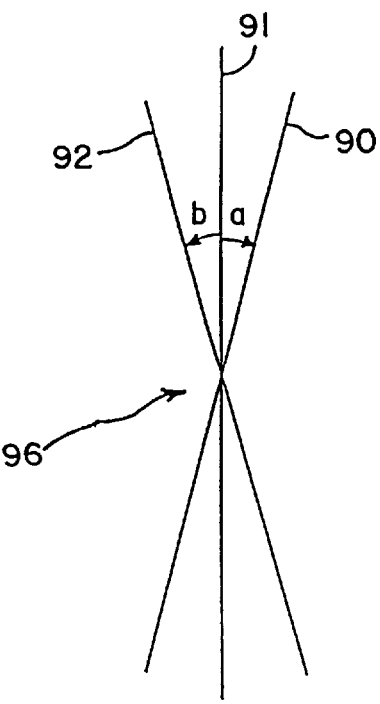
FIG. 12c is based on a top view of the reverse helical mixing paddle of FIG. 12a, showing only the top intersection line 92 superimposed over the bottom intersection line 90, and a reference line 91.

The degree of rotation of lines 90 and 92 for the forward and reverse helical paddles 95 and 96 can be explained with reference to FIGS. 11c and 12c. In FIGS. 11c and 12c, the helical paddles have been viewed from above and only the lines 90 and 92 of the paddles are shown, superimposed one on top of the other. A reference line 91 is also shown, indicating the positions of lines 90 and 92 if there were no rotation, as in a flat paddle 85.

Referring to FIG. 11c, the angle "a" is the amount of counter-clockwise rotation of line 90 present in a forward helical paddle 95. The angle "a" should be between about 5 and about 30 degrees, preferably between about 10 and about 18 degrees, most preferably about 13 degrees, 53 minutes, 50 seconds. The angle "b" is the amount of clockwise rotation of line 92 present in a forward helical paddle 95. The angle "b" should be between about 5 and about 30 degrees, preferably between about 10 and about 18 degrees, most preferably about 13 degrees, 53 minutes, 50 seconds.

Referring to FIG. 12c, the angle "a" is the amount of clockwise rotation of line 90 present in a reverse helical paddle 96. The angle "a" should be between about 5 and about 30 degrees, preferably between about 10 and about 18 degrees, most preferably about 13 degrees, 53 minutes, 50 seconds. The angle "b" is the amount of counter-clockwise rotation of line 92 present in a reverse helical paddle 96. The angle "b" should be between about 5 and about 30 degrees, preferably between about 10 and about 18 degrees, most preferably about 13 degrees, 53 minutes, 50 seconds.

Referring to FIG. 13, the mixing paddles and feed elements are assembled on two parallel shafts 110 in a predetermined configuration. In the embodiment shown, for a 5-inch paddle mixer, each of the shafts 110 has an active length of 36 inches and a square cross-sectional area of 1.375 inches×1.375 inches (1.891 square inches). The parallel shafts 110 are spaced apart at a distance of 3.5 inches (center to center). The shafts 110 are adapted for co-rotation (rotation in the same direction) inside a mixing barrel. Each of the shafts 110 supports an identical arrangement of mixing paddles and feed elements. The mixing paddles and feed elements on the adjacent shafts may intermesh, as shown in FIG. 13, but do not touch each other, as the shafts rotate.

Each of the shafts 110 is long enough to accommodate thirty-six inches of elements, each having a length of 1 inch, a maximum diameter of 4.874 inches and a minimum diameter of 2 inches. Two or more 1-inch segments may be combined to make longer elements without affecting the operation. For instance, the feed elements 50 often have a length of 2 inches. For purposes of the invention, a large portion of each shaft should be covered with mixing paddles. Generally, at least about 40 percent of each shaft should be covered with mixing paddles. Preferably at least about 50 percent of each shaft is covered with mixing paddles, most preferably at least about 60 percent. Of the mixing paddles, a majority should be flat mixing paddles as opposed to forward helical or reverse helical paddles. In the embodiment shown in FIG. 13, 67 percent of the shaft length is covered with mixing paddles (24 one-inch elements) and 33 percent of the shaft length is covered with feed elements (6 two-inch elements).

The mixer configuration 102 in FIG. 13 includes two feed zones 125 and 135, and two paddle mixing zones 130 and 150. The specific mixer configuration is indicated in Table 1 below. In Table 1 and other tables, the following abbreviations are used:

FC—feed conveying element (each occupying two 1-inch positions)

FP—flat mixing paddle (each occupying one 1-inch position)

FH—forward helical mixing paddle (each occupying one 1-inch position)

RH—reverse helical mixing paddle (each occupying one 1-inch position)

TABLE 1

Mixer Configuration (Per Shaft) - FIG. 13

| Longitudinal Position | Element | Rotational Position | Longitudinal Position | Element | Rotational Position |
|---|---|---|---|---|---|
| 1 | FC | 4 | 19 | FP | 3 |
| 2 | FC | 4 | 20 | FC | 3 |
| 3 | FC | 4 | 21 | FC | 3 |
| 4 | FC | 4 | 22 | FC | 3 |
| 5 | FC | 4 | 23 | FC | 3 |
| 6 | FC | 4 | 24 | FP | 3 |
| 7 | FC | 4 | 25 | FP | 3 |
| 8 | FC | 4 | 26 | FP | 3 |
| 9 | FP | 4 | 27 | FP | 1 |
| 10 | FP | 4 | 28 | FP | 1 |
| 11 | FP | 4 | 29 | FP | 1 |
| 12 | FP | 2 | 30 | FP | 3 |
| 13 | FP | 2 | 31 | FP | 3 |
| 14 | FP | 2 | 32 | FP | 3 |
| 15 | FP | 3 | 33 | FP | 4 |
| 16 | FP | 4 | 34 | FP | 1 |
| 17 | FP | 1 | 35 | FP | 2 |
| 18 | FP | 2 | 36 | RH | 1 |

The use of two or more feed zones and two or more mixing zones in the mixer configuration 102, permits sequential addition and mixing of different gum base ingredients. For example, a high viscosity portion including elastomer, filler, and some resin or polyvinyl acetate can be continuously fed to the first feed zone 125 in FIG. 13. These ingredients can then be thoroughly mixed in the first paddle mixing zone 130 before being combined with additional ingredients. A lower viscosity portion including waxes (when used), fats, oils, colorants and additional resin or polyvinyl acetate can be continuously fed to the second feed zone 135. All gum base ingredients can then be thoroughly mixed in the second paddle mixing zone 150.

The mixer configuration 102 shown in FIG. 13 is, in practice, surrounded by one or more barrel segments extending the length of the mixer configuration 102. FIG. 14 illustrates, schematically, a typical barrel 105 surrounding the mixer configuration 102. A motor 101 drives the shafts 110 which support the mixer elements. The gum base ingredients are fed through feed ports 103 and 123 in the barrel 105. The gum base remains in the mixer for a sufficient time to ensure homogeneity, for example, a time on the order of about 20–30 minutes, and exits through an exit nozzle 155. The barrel 105 may be heated or cooled. Heating may be accomplished using hot water or a steam jacket surrounding the barrel (not shown). Cooling may be accomplished by supplying cooling water to a jacket surrounding the barrel 105. Alternative methods of heating and cooling may also be employed. Generally, heating is applied at the start up, but cooling is applied in the latter stages to prevent overheating and base degradation.

The heating and cooling of the barrel should be supplied, as necessary, to maintain the product exit temperatures at about 90° C.–150° C., preferably at about 100°–135° C., during mixing of the gum base ingredients.

Figure 15:
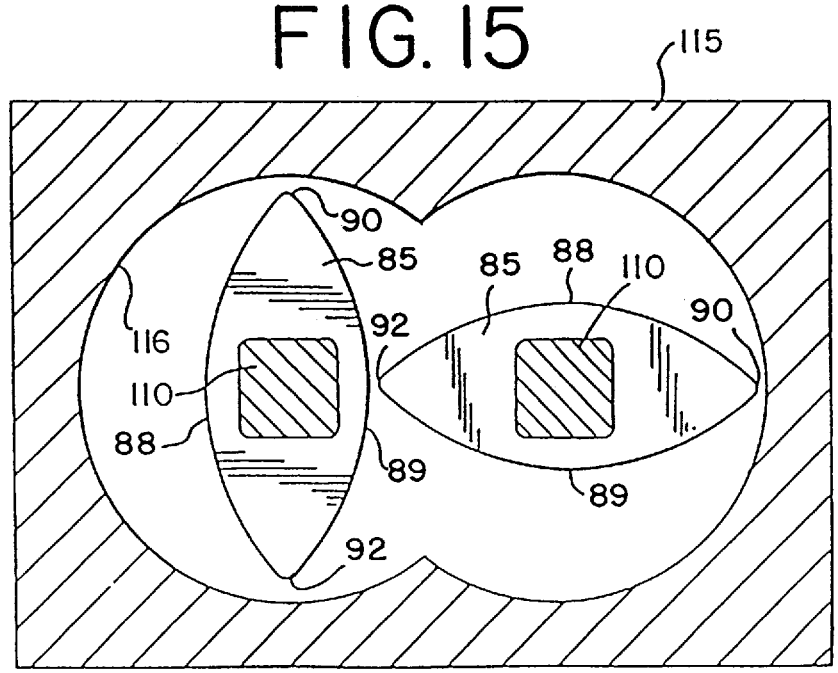
FIG. 15 is a cross-sectional view taken along line 15—15 of FIG. 14, showing the relationship between the rotating paddles and the barrel wall.

FIG. 15 is a sectional view of the barrel 105 which indicates how the paddle mixer is able to operate with longer residence times, compared to a conventional twin screw extruder. As shown in FIG. 15, the barrel wall 116 has the shape of two intersecting cylinders, each cylinder having a diameter larger than the largest diameter of the mixing paddle 85 contained therein. This barrel configuration resembles that of a standard twin screw extruder. However, unlike the screws of a twin screw extruder, the paddles 85 do not mostly fill the space defined by the barrel wall 116.

The mixing paddles 85 have a typically close tolerance with the barrel wall 116, and with each other, in the vicinity of the lines 90 and 92 where the concave surfaces intersect.

For paddles 85 having a long diameter of 4.874 inches, the closest tolerance between each paddle and the barrel wall 116 may be on the order of about 0.048 inch to about 0.078 inch, and the closest tolerance between the two paddles may be on the order of about 0.060 inch to about 0.090 inch. However, away from the lines 90 and 92, the distance between each paddle 85 and the barrel wall 116 is much greater. Due to the unique design of the paddles 85, the percentage of barrel space occupied by the paddles 85 is much smaller than for a conventional twin screw extruder. Also, the pressure in the paddle mixer should remain below about 50 psig, preferably below about 20 psig, when there is a large percentage of paddles compared to other elements. Each paddle 85, when viewed from the front as in FIG. 15, has a smaller width than height. Preferably, the ratio of height to width of each mixing paddle is more than 1.5:1. Most preferably, the ratio of height to width for each mixing paddle is more than 2:1.

The large amount of available barrel space also allows the method of the invention to be practiced at high residence times in paddle mixers. The high proportion of mixing paddles, especially flat paddles, also contributes to the longer residence times and lower pressure. The average residence time in the paddle mixer should be at least about 10 minutes, preferably more than 15 minutes, most preferably more than 20 minutes.

The remaining operating parameters, e.g., mixer rpm, feed rates, production rates, etc. vary depending on the size of the mixer and on the specific gum base composition. A commercially available paddle mixer suitable for practicing the invention is a Teledyne Readco Continuous Processor, available from Teledyne Readco in York, Pa. These paddle mixers are available in a wide variety of sizes. Paddle diameters for the different size mixers range from 2 to 24 inches, and the ratios of mixer length to diameter (L/D) range from 4:1 to 14:1. For purposes of the present invention, the maximum paddle diameter is preferably between 2 inches and 5 inches, and the L/D is preferably about 7:1. The paddle mixer configuration and process conditions should be selected so that a homogeneous gum base product is achieved.

In a particularly useful embodiment, two or more paddle mixers may be used in series, in the manner illustrated in FIG. 16. The use of two mixers in series allows greater flexibility for feeding different gum base ingredients at different locations. A combination of elastomer, filler and resin can be continuously fed via feed port 103 to the feed barrel 105 of the first mixer. These materials are mixed in the first mixer, after which additional resin can be added to the first mixer via feed port 123. The combined ingredients are blended in the first mixer, and leave the first mixer at the exit 155, whereupon they are immediately fed into the barrel 205 of the second mixer 208 (powered by motor 201) via the feed port 203. Polyvinyl acetate can also be continuously fed to the barrel 205 from hopper 207, via feed conveyor 209 and feed port 203.

Further ingredients, such as waxes or oils, can be injected into the second mixer from feed tanks 211 and 231, via pumps 213 and 233. Optionally, a portion of ingredients can be added into a downstream feed port 204. After all the components are mixed, the gum base leaves the second mixer via exit 255. A wide variety of different feeding and mixing arrangements can also be employed using two or more paddle mixers in series, in order to achieve good dispersion of ingredients and a wide variety of gum base products.

In addition to the paddles described above, a wide variety of mixing paddles, available from various extruder companies, can be used. Paddles, often called kneading elements, must have the effect of mixing in an extruder. Paddles can be two-sided, three-sided, or multiple sided.

The paddle mixer, which may be referred to as a compounder, has different characteristics than a typical extruder even though the same equipment may be used. The difference between an extruder and a compounder is the ratio of paddles or kneading elements to the conveying elements. Conveying elements and compression elements cause an extruder to build up pressure. Paddles or kneading elements do not build as much pressure in the extruder, thus there is more mixing with low pressure. If the extruder contains at least 40% kneading elements, then the pressure can be about one-fifth to one-tenth that of a typical extruder which uses more conveying and compression elements.

Nearly all extruders can be used as compounders. However, compounders which have a low L/D ratio of about 3:1 to 20:1 cannot generally be used as high pressure extruders. Also, compounders with this low L/D ratio have less effective shaft length and may require more paddle or kneading elements compared to conveying elements. For this type of compounder, mixing paddles should cover at least 50%, and preferably at least 60% of the shaft. Conversely, for an extruder having an L/D of about 20/1 to about 40/1, only about 40% of the shaft needs to be covered with mixing paddles or kneading elements. For extruders with high L/D ratios greater than 40/1, only about 30% of the shaft may need to be covered with mixing paddles or kneading elements.

One of the key advantages to the preferred embodiment of the paddle mixer disclosed above is that the residence time is much higher than in typical extruders. Many extruders provide a residence time of less than 2 minutes or even less than 1 minute. However, in the preferred paddle mixer described above, a residence time of at least 10 minutes, and preferably at least 15–20 minutes, can be provided.

C. Blade-and-Pin Mixers

The method of the present invention may also be advantageously performed using a continuous mixer whose mixing screw is composed primarily of precisely arranged mixing elements with only a minor fraction of simple conveying elements. A presently preferred mixer is a blade-and-pin mixer exemplified in FIG. 17. This mixer may be used to produce not only gum base, but an entire chewing gum composition. A blade-and-pin mixer uses a combination of selectively configured rotating mixer blades and stationary barrel pins to provide efficient mixing over a relatively short distance. A commercially available blade-and-pin mixer is the Buss kneader, manufactured by Buss AG in Switzerland, and available from Buss America, located in Bloomingdale, Ill.

Figure 17:
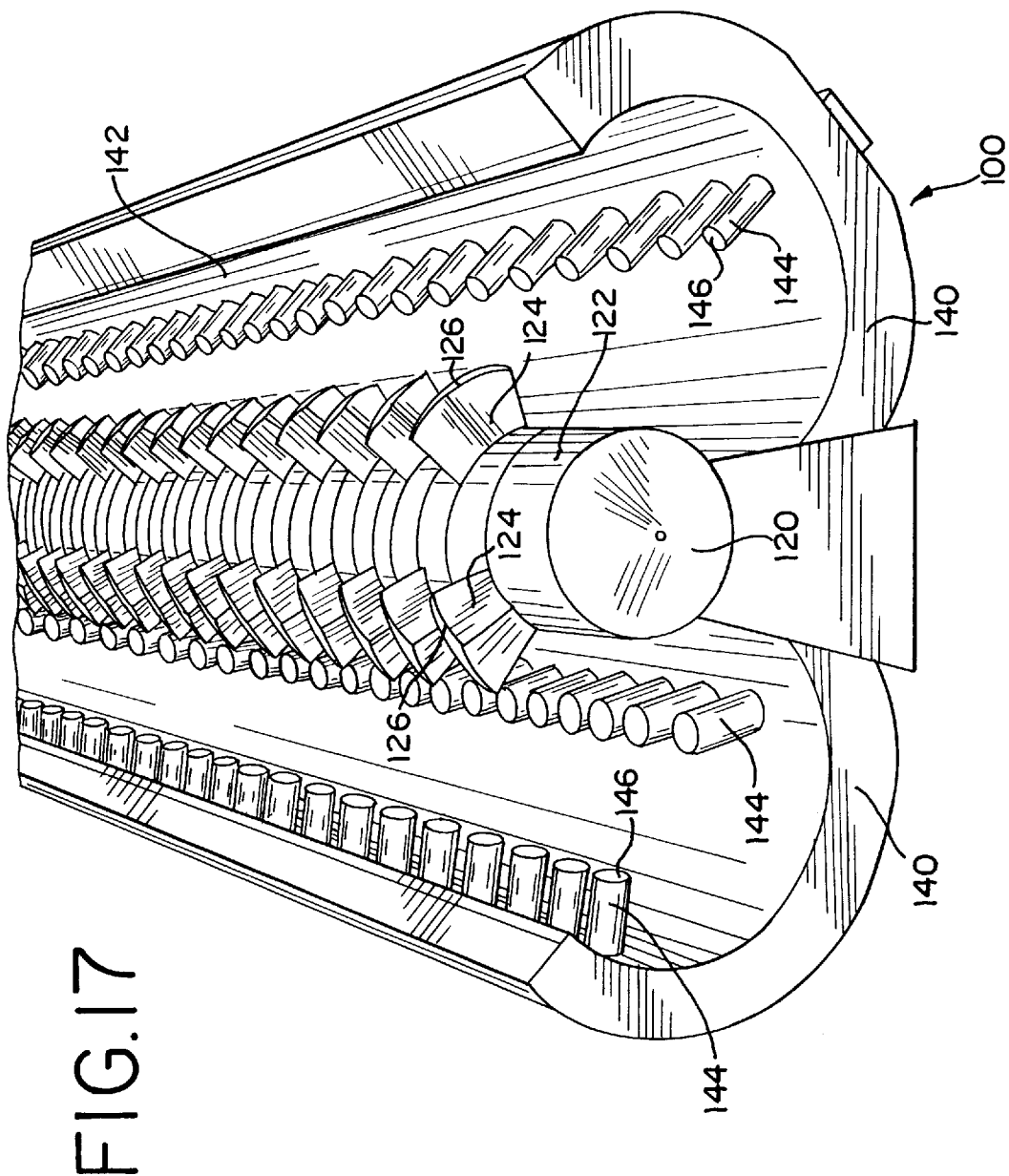
FIG. 17 is a partial exploded perspective view of a Buss high efficiency, blade-and-pin mixer used to practice another embodiment of the invention, illustrating a mixing barrel and mixing screw arrangement.

Referring to FIG. 17, a presently preferred blade-and-pin mixer 100 includes a single mixing screw 120 turning inside a barrel 140 which, during use, is generally closed and completely surrounds the mixing screw 120. The mixing screw 120 includes a generally cylindrical shaft 122 and three rows of mixing blades 124 arranged at evenly spaced locations around the screw shaft 122 (with only two of the rows being visible in FIG. 17). The mixing blades 124 protrude radially outward from the shaft 122, with each one resembling the blade of an axe.

The mixing barrel 140 includes an inner barrel housing 142 which is generally cylindrical when the barrel 140 is closed around the screw 120 during operation of the mixer 100. Three rows of stationary pins 144 are arranged at evenly spaced locations around the screw shaft 122, and protrude radially inward from the barrel housing 142. The pins 144 are generally cylindrical in shape, and may have rounded or bevelled ends 146.

The mixing screw 120 with blades 124 rotates inside the barrel 140 and is driven by a variable speed motor (not shown). During rotation, the mixing screw 120 also moves back and forth in an axial direction, creating a combination of rotational and axial mixing which is highly efficient. During mixing, the mixing blades 124 continually pass between the stationary pins 144, yet the blades and the pins never touch each other. Also, the radial edges 126 of the blades 124 never touch the barrel inner surface 142, and the ends 146 of the pins 144 never touch the mixing screw shaft 122.

FIGS. 18–22 illustrate various screw elements which can be used to configure the mixing screw 120 for optimum use. FIGS. 18a and 18b illustrate on-screw elements 60 and 61 which are used in conjunction with a restriction ring assembly. The on-screw elements 60 and 61 each include a cylindrical outer surface 62, a plurality of blades 64 projecting outward from the surface 62, and an inner opening 66 with a keyway 68 for receiving and engaging a mixing screw shaft (not shown). The second on-screw element 61 is about twice as long as the first on-screw element 60.

Figure 18A:
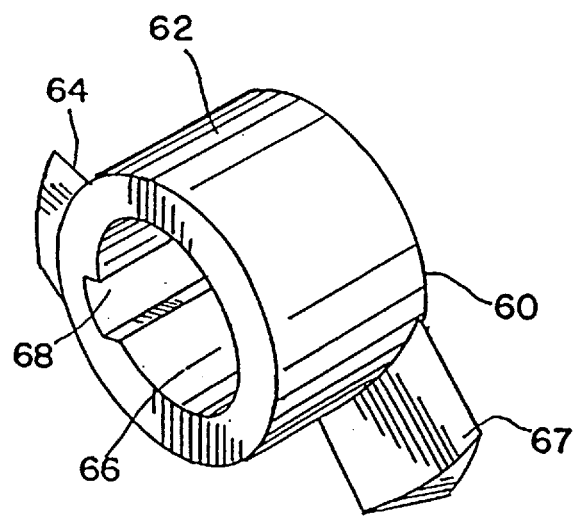
FIG. 18a is a perspective view of an on-screw element used on the upstream side of a restriction ring assembly in the high efficiency mixer of FIG. 17.
Figure 18B:
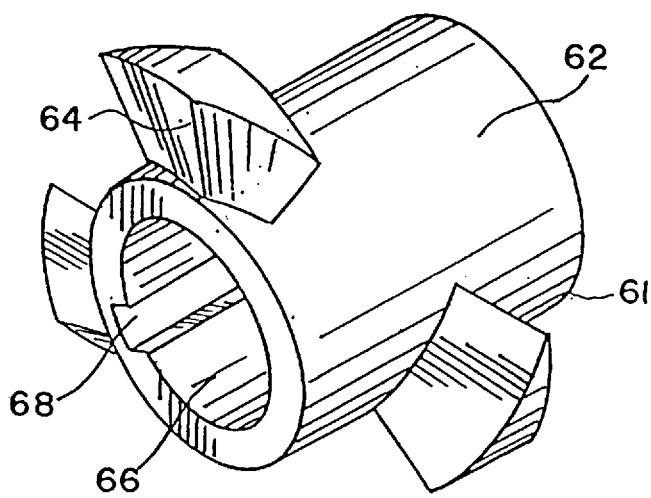
FIG. 18b is a perspective view of an on-screw element used on the downstream side of the restriction ring assembly in the high efficiency mixer of FIG. 17.
Figure 18C:
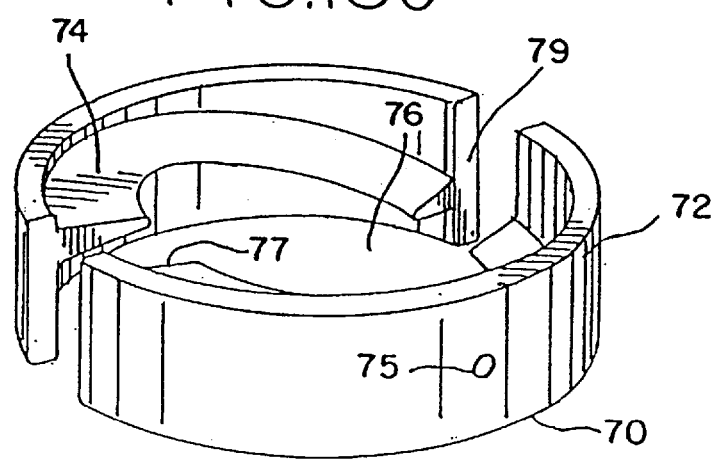
FIG. 18c is a perspective view of a restriction ring assembly used in the high efficiency mixer of FIG. 17.

FIG. 18c illustrates a restriction ring assembly 70 used to build back pressure at selected locations along the mixing screw 120. The restriction ring assembly 70 includes two halves 77 and 79 mounted to the barrel housing 142, which halves engage during use to form a closed ring. The restriction ring assembly 70 includes a circular outer rim 72, an inner ring 74 angled as shown, and an opening 76 in the inner ring which receives, but does not touch, the on-screw elements 60 and 61 mounted to the screw shaft. Mounting openings 75 in the surface 72 of both halves of the restriction ring assembly 70 are used to mount the halves to the barrel housing 142.

FIG. 19 illustrates the relationship between the restriction ring assembly 70 and the on-screw elements 60 and 61 during operation. When the mixing screw 120 is turning inside the barrel 140, and reciprocating axially, the clearances between the on-screw elements 60 and 61 and the inner ring 74 provide the primary means of passage of material from one side of the restriction ring assembly 70 to the other. The on-screw element 60 on the upstream side of the restriction ring assembly includes a modified blade 67 permitting clearance of the inner ring 74. The other on-screw element 61 is placed generally downstream of the restriction ring assembly 70, and has an end blade (not visible) which moves close to and wipes the opposite surface of the inner ring 74.

The clearances between outer surfaces 62 of the on-screw elements 60 and 61 and the inner ring 74 of the restriction ring assembly 70, which can vary and preferably are on the order of 1–5 mm, determine to a large extent how much pressure build-up will occur in the upstream region of the restriction ring assembly 70 during operation of the mixer 100. It should be noted that the upstream on-screw element 60 has an L/D of about $\frac{1}{3}$, and the downstream on-screw element 61 has an L/D of about $\frac{2}{3}$, resulting in a total L/D of about 1.0 for the on-screw elements. The restriction ring assembly 70 has a smaller L/D of about 0.45 which coincides with the L/D of the on-screw elements 60 and 61, which engage each other but do not touch the restriction ring assembly.

Figure 20:
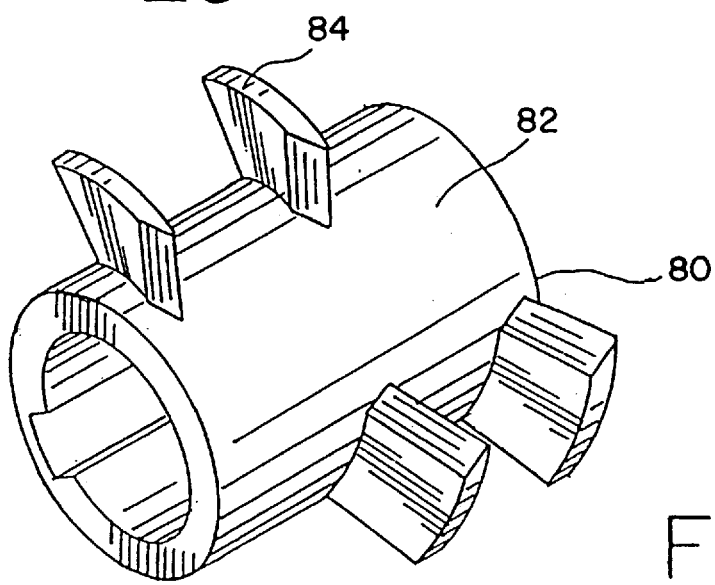
FIG. 20 is a perspective view of a low-shear mixing screw element used in the high efficiency mixer of FIG. 17.
Figure 21:
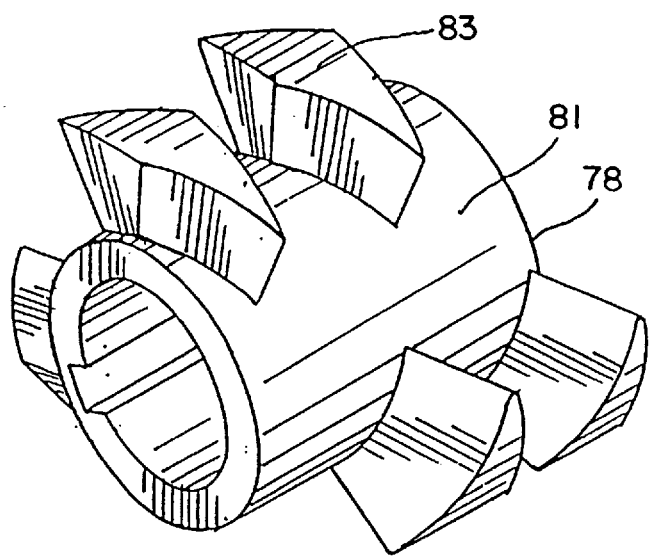
FIG. 21 is a perspective view of a high-shear mixing screw element used in the high efficiency mixer of FIG. 17.
Figure 22:
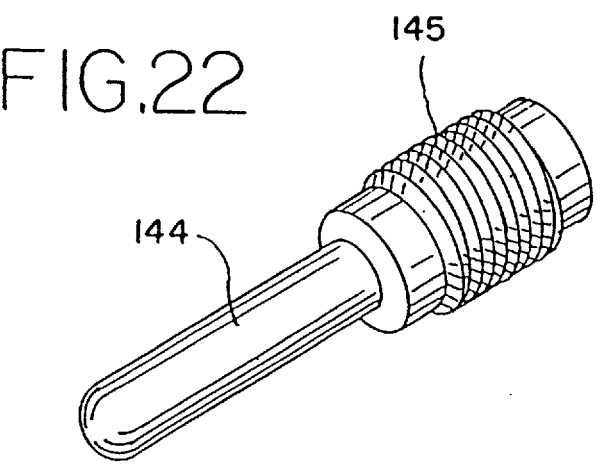
FIG. 22 is a perspective view of a barrel pin element used in the high efficiency mixer of FIG. 17.

FIGS. 20 and 21 illustrate the mixing or "kneading" elements which perform most of the mixing work. The primary difference between the lower shear mixing element 80 of FIG. 20 and the higher shear mixing element 78 of FIG. 21 is the size of the mixing blades which project outward on the mixing elements. In FIG. 21, the higher shear mixing blades 83 which project outward from the surface 81 are larger and thicker than the lower shear mixing blades 84 projecting outward from the surface 82 in FIG. 20. For each of the mixing elements 80 and 78, the mixing blades are arranged in three circumferentially-spaced rows, as explained above with respect to FIG. 17. The use of thicker mixing blades 83 in FIG. 21 means that there is less axial distance between the blades and also less clearance between the blades 83 and the stationary pins 144 as the screw 120 rotates and reciprocates axially (FIG. 17). This reduction in clearance causes inherently higher shear in the vicinity of the mixing elements 78. FIG. 22 illustrates a single stationary pin 144 detached from the barrel 140. The pin 144 includes a threaded base 145 which permits attachment at selected locations along the inner barrel shaft 142. It is also possible to configure some of the pins 144 as liquid injection ports by providing them with hollow center openings.

Figure 23:
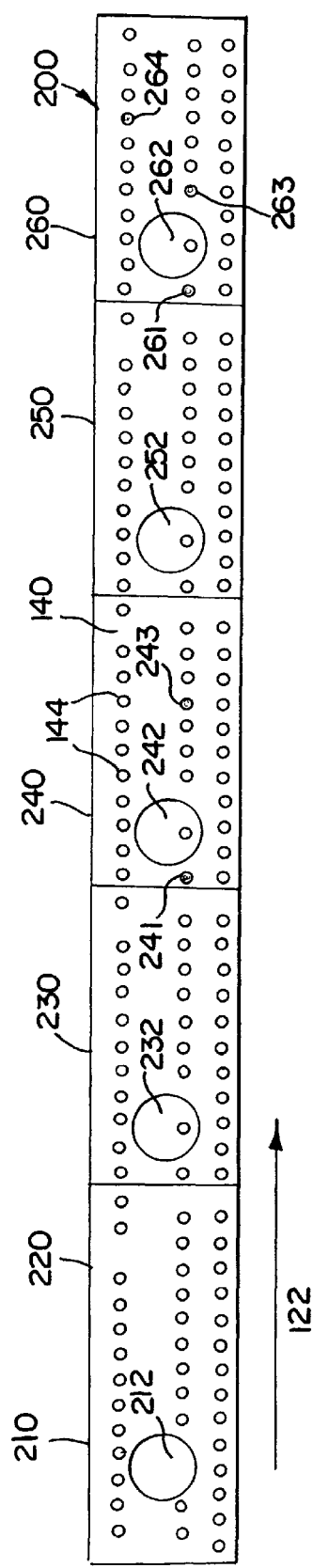
FIG. 23 is a schematic diagram of an arrangement of mixing barrel pins and ingredient feed ports used with the high efficiency mixer of FIG. 17.
Figure 24:
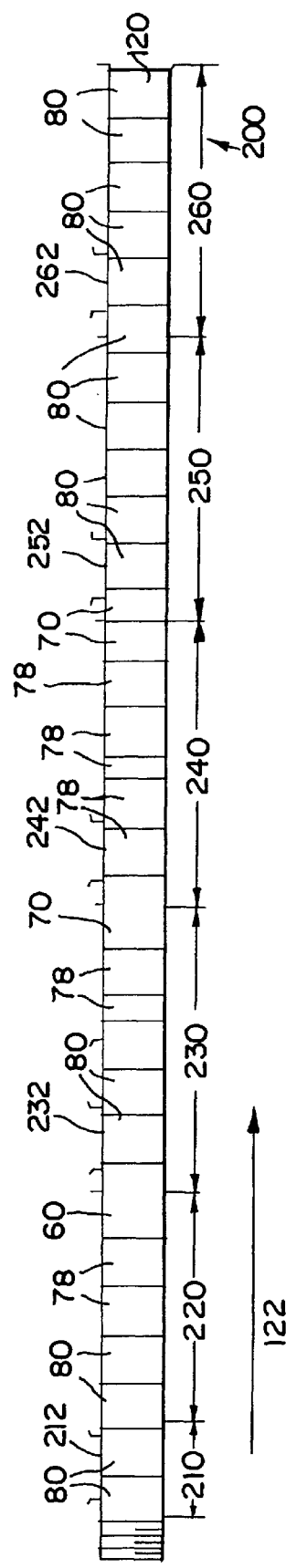
FIG. 24 is a schematic diagram of a presently preferred mixing screw configuration used with the high efficiency mixer of FIG. 17.

FIG. 23 is a schematic view showing the presently preferred barrel configuration, including the presently preferred arrangement of barrel pins 144. FIG. 24 is a corresponding schematic view illustrating the presently preferred mixing screw configuration. The mixer 200 whose preferred configuration is illustrated in FIGS. 23 and 24 has an overall active mixing L/D of about 19.

The mixer 200 includes an initial feed zone 210 and five mixing zones 220, 230, 240, 250 and 260. The zones 210, 230, 240, 250 and 260 include five possible large feed ports 212, 232, 242, 252 and 262, respectively, which can be used to add major (e.g. solid) ingredients to the mixer 200. The zones 240 and 260 are also configured with five smaller liquid injection ports 241, 243, 261, 263 and 264 which are used to add liquid ingredients. The liquid injection ports 241, 243, 261, 263 and 264 include special barrel pins 144 formed with hollow centers, as explained above.

Referring to FIG. 23, barrel pins 144 are preferably present in most or all of the available locations, in all three rows as shown.

Referring to FIG. 24, the presently preferred configuration of the mixing screw 120 for most chewing gum products is schematically illustrated as follows. Zone 210, which is the initial feed zone, is configured with about 1⅓ L/D of low shear elements, such as the element 40 shown in FIG. 4. The L/D of the initial feed zone 210 is not counted as part of the overall active mixing L/D of 19, discussed above, because its purpose is merely to convey ingredients into the mixing zones.

The first mixing zone 220 is configured, from left to right (FIG. 24), with two low shear mixing elements 80 (FIG. 20) followed by two high shear elements 78 (FIG. 21). The two low shear mixing elements contribute about 1⅓ L/D of mixing, and the two high shear mixing elements contribute about 1⅓ of mixing. Zone 220 has a total mixing L/D of about 3.0, including the end part covered by a 57 mm restriction ring assembly 70 with cooperating on-screw elements 60 and 61 (not separately designated in FIG. 24).

The restriction ring assembly 70 with cooperating on-screw elements 60 and 61, straddling the end of the first mixing zone 220 and the start of the second mixing zone 230, have a combined L/D of about 1.0, part of which is in the second mixing zone 230. Then, zone 230 is configured, from left to right, with three low shear mixing elements 80 and 1.5 high shear mixing elements 78. The three low shear mixing elements contribute about 2.0 L/D of mixing, and the 1.5 high shear mixing elements contribute about 1.0 L/D of mixing. Zone 230 has a total mixing L/D of about 4.0.

Straddling the end of the second mixing zone 230 and the start of the third mixing zone 240 is a 60 mm restriction ring assembly 70 with cooperating on-screw elements 60 and 61 having an L/D of about 1.0. Then, zone 240 is configured, from left to right, with 4.5 high shear mixing elements 78 contributing a mixing L/D of about 3.0. Zone 240 also has a total mixing L/D of about 4.0.

Straddling the end of the third mixing zone 240 and the start of the fourth mixing zone 250 is another 60 mm restriction ring assembly 70 with cooperating on-screw elements having an L/D of about 1.0. Then, the remainder of the fourth mixing zone 250 and the fifth mixing zone 260 are configured with eleven low shear mixing elements 80 contributing a mixing L/D of about 7⅓. Zone 250 has a total mixing L/D of about 4.0, and zone 260 has a total mixing L/D of about 4.0.

EXAMPLE 1

This example was performed using a two-mixer arrangement. A 2-inch Teledyne Readco Continuous Mixer was configured as described in Table 2. A 5-inch Teledyne Readco Continuous Mixer was configured as described in Table 1 except that a reverse helical paddle was placed in position 19. The feed ports were arranged as follows:

Feed Port No. 1—above longitudinal positions 1–4 on 2-inch mixer

Feed Port No. 2—above longitudinal positions 1–4 on 5-inch mixer

Feed Port No. 3—above longitudinal positions 20–23 on 5-inch mixer

TABLE 2

Mixer Configuration (Per Shaft)
For 2-Inch Teledyne Readco Mixer

| Longitudinal Position | Element | Rotational Position | Longitudinal Position | Element | Rotational Position |
|---|---|---|---|---|---|
| 1 | FC | 4 | 16 | FP | 2 |
| 2 | FC | 4 | 17 | FP | 4 |
| 3 | FC | 4 | 18 | FP | 4 |
| 4 | FC | 4 | 19 | FP | 4 |
| 5 | FP | 4 | 20 | FP | 2 |
| 6 | FP | 4 | 21 | FP | 2 |
| 7 | FP | 4 | 22 | FP | 2 |
| 8 | FP | 2 | 23 | FP | 3 |
| 9 | FP | 2 | 24 | FP | 4 |
| 10 | FP | 2 | 25 | FP | 1 |
| 11 | FP | 4 | 26 | FP | 2 |
| 12 | FP | 4 | 27 | FP | 4 |
| 13 | FP | 4 | 28 | FP | 4 |
| 14 | FP | 2 | 29 | RH | 2 |
| 15 | FP | 2 | | | |

Using the above mixer arrangement, chewing gum base was made as follows.

A mixture of ground isobutylene-isoprene copolymer (2–7 mm particle size), calcium carbonate (<12 micron particle size), and terpene resin at a ratio of 8:21:17 was fed at a rate of 0.383 lb/min. at the first feed inlet. In the second feed inlet, a powder blend of polyvinyl acetate, glycerol monostearate, and hydrogenated soybean and vegetable oil at a ratio of 24:5:13 were fed at a rate of 0.35 lb/min. In the third feed port, 6 parts of polyisobutylene at 130° C. at a feed rate of 0.05 lb/min. and 6 parts of a 50/50 mixture of hydrogenated cottonseed oil/lecithin at 70° C. at a feed rate of 0.05 lb/min. were added.

Overall, the production rate for the gum base was 50 pounds per hour. The gum base was manufactured using the following process conditions:

| | 2-Inch Mixer | 5-Inch Mixer |
|---|---|---|
| RPM | 310 | 387 |
| Initial Barrel Temp., °F. | 275–280 | 235–240 |
| Product Exit Temp., °C. | 162 | 120 |
| Average Residence Time | 2–6 min. | 30–40 min. |

About 40 pounds of gum base product was made at these conditions. The gum base had normal color, a smooth texture, and a homogeneous consistency, except for an occasional isolated undispersed particle.

EXAMPLE 2

This example was performed using a two-mixer arrangement with two 5-inch Teledyne Readco Continuous Mixer Compounders. The first compounder was configured as in Table 3. The second compounder was configured based on Table 1, shown previously. This configuration is also shown in FIG. 13.

The feed ports were arranged as follows:

| Feed Port No. 1 - | above longitudinal positions 1–4 on first 5-inch mixer |
|---|---|
| Feed Port No. 2 - | above longitudinal positions 1–4 on second 5-inch mixer |
| Feed Port No. 3 - | above longitudinal positions 20–23 on second 5-inch mixer. |

TABLE 3

Mixer Configuration (Per Shaft)
For 5-Inch Teledyne Readco Mixer

| Longitudinal Position | Element | Rotational Position | Longitudinal Position | Element | Rotational Position |
|---|---|---|---|---|---|
| 1 | FC | 4 | 19 | FP | 2 |
| 2 | FC | 4 | 20 | FP | 2 |
| 3 | FC | 4 | 21 | FP | 4 |
| 4 | FC | 4 | 22 | FP | 4 |
| 5 | FC | 4 | 23 | FP | 4 |
| 6 | FC | 4 | 24 | FP | 2 |
| 7 | FC | 4 | 25 | FP | 2 |
| 8 | FC | 4 | 26 | FP | 2 |
| 9 | FP | 4 | 27 | FP | 4 |
| 10 | FP | 4 | 28 | FP | 4 |
| 11 | FP | 4 | 29 | FP | 4 |
| 12 | FP | 2 | 30 | FP | 1 |
| 13 | FP | 2 | 31 | FP | 2 |
| 14 | FP | 2 | 32 | FP | 3 |
| 15 | FP | 4 | 33 | FP | 4 |
| 16 | FP | 4 | 34 | FP | 2 |
| 17 | FP | 4 | 35 | FP | 2 |
| 18 | FP | 2 | 36 | RH | 4 |

Using the above mixer arrangement, chewing gum base was made as follows:

A mixture of ground isobutylene-isoprene copolymer (2–7 mm particle size), calcium carbonate (<12 micron particle size), terpene resin, and powder color at a ratio of 11:18:17:1 was fed at a rate of 1.435 lb/min. in the first feed inlet. In the second feed inlet, a powder blend of polyvinyl acetate, glycerol monostearate, and hydrogenated soybean and vegetable oil at a ratio of 24:5:12 was fed at a rate of 1.264 lb/min. In the third feed port, 6 parts of polyisobutylene at 95° C. at a feed rate of 0.181 lb/min. and 6 parts of a 50/50 mixture of hydrogenated cottonseed oil/lecithin at 80° C. at a feed rate of 0.203 lb/min. were added.

Overall, the production rate for the gum base was about 185 pounds per hour. The gum base was manufactured using the following process conditions:

|  | First 5-Inch Mixer | Second 5-Inch Mixer |
|---|---|---|
| RPM | 250 | 400 |
| Initial Barrel Temp., °C. | 135 | 115 |
| Product Exit Temp., °C. | 190 | 115 |
| Average Residence Time | 20 min. | 10 min. |

About 200 pounds of gum base product was made. The gum base had normal color, no lumps, no unincorporate oil, but had a burnt off taste and odor.

EXAMPLE 3

This example was performed using a two-mixer arrangement with two 5-inch Teledyne Readco Continuous Mixer Compounders. Both compounders were configured with the same paddle configuration that was shown in Table 1. Four feed ports were arranged as follows:

| Feed Port No. 1 - | above longitudinal positions 1–4 on first 5-inch mixer |
|---|---|
| Feed Port No. 2 - | above longitudinal positions 20–23 on first 5-inch Mixer |
| Feed Port No. 3 - | above longitudinal positions 1–4 on second 5-inch mixer |
| Feed Port No. 4 - | above longitudinal positions 20–23 on second 5-inch mixer. |

Using the above mixer arrangement, chewing gum base was made as follows:

A mixture of ground isobutylene-isoprene copolymer (2–7 mm particle size), calcium carbonate (<12 micron particle size), and polyvinyl acetate at a ratio of 13:10:7 was fed at a rate of 0.75 lb/min. in the first feed inlet. In the second feed inlet, 15 parts of polyvinyl acetate was added at 0.375 lb/min. In the third feed port, hydrogenated vegetable oil, hydrogenated soybean oil, and glycerol monostearate at a ratio of 13:13:3 were added at a rate of 0.725 lb/min. In the fourth feed port, 10 parts of partially hydrogenated vegetable oil at 0.25 lb/min., and 16 parts of polyisobutylene at 130° C. at a rate of 0.40 lb/min. were added.

Overall, the production rate for the gum base was 150 pounds per hour. The gum base was manufactured using the following process conditions:

|  | First 5-Inch Mixer | Second 5-Inch Mixer |
|---|---|---|
| RPM | 373 | 374 |
| Initial Barrel Temp., °C. | 150–180 | 110 |
| Product Exit Temp., °C. | 165–191 | 111 |
| Average Residence Time | 20–30 min. | 12–15 min. |

About 400 pounds of gum base product was made. The gum base had normal color, no lumps, no unincorporated oil, and clean taste and odor.

EXAMPLE 4

This example was performed using a two-mixer arrangement with two 5-inch Teledyne Readco Continuous Mixer Compounders. Both compounders were configured according to the following Table 4. The feed ports were the same as Example 3, except feed port No. 2 was closed off.

TABLE 4

| Mixer Configuration (Per Shaft) | | | | | |
|---|---|---|---|---|---|
| Longitudinal Position | Element | Rotational Position | Longitudinal Position | Element | Rotational Position |
| 1 | FC | 4 | 19 | FP | 3 |
| 2 | FC | 4 | 20 | FC | 3 |
| 3 | FC | 4 | 21 | FC | 3 |
| 4 | FC | 4 | 22 | FC | 3 |
| 5 | FC | 4 | 23 | FC | 3 |
| 6 | FC | 4 | 24 | FC | 3 |
| 7 | FC | 4 | 25 | FC | 3 |
| 8 | FC | 4 | 26 | FC | 3 |
| 9 | FP | 4 | 27 | FC | 3 |
| 10 | FP | 4 | 28 | FP | 2 |
| 11 | FP | 4 | 29 | FP | 2 |
| 12 | FP | 2 | 30 | FP | 4 |
| 13 | FP | 2 | 31 | FP | 4 |
| 14 | FP | 2 | 32 | FP | 4 |
| 15 | FP | 4 | 33 | FP | 2 |
| 16 | FP | 4 | 34 | FP | 2 |
| 17 | FP | 1 | 35 | FP | 4 |
| 18 | FP | 2 | 36 | RH | 4 |

Using the above mixer arrangement, chewing gum base was made as follows.

A mixture of ground isobutylene-isoprene copolymer (2–7 mm particle size), and calcium carbonate, terpene resins, and polyvinyl acetate at a ratio of 11:18:17:1 was added at a rate of 1.175 lb/min. to feed inlet No. 1. To feed inlet No. 3 a powder blend of polyvinyl acetate, glycerol monostearate, hydrogenated soybean and vegetable oils, and powdered color at a ratio of 23:5:12:1 was fed at a rate of 1.025 lb/min. To feed inlet No. 4, 6 parts of polyisobutylene at 130° C. was added at a rate of 0.15 lb/min., and 6 parts of a 50/50 blend of lecithin and hydrogenated cottonseed oil at 90° C. was added at a rate of 0.15 lb/min.

Overall, the production rate for the gum base was 150 pounds per hour. The gum base was manufactured using the following process conditions:

|  | First 5-Inch Mixer | Second 5-Inch Mixer |
|---|---|---|
| RPM | 250 | 376 |
| Initial Barrel Temp., °C. | 150–180 | 110 |
| Product Exit Temp., °C. | 175 | 120 |
| Average Residence Time | 20–30 min. | 12–15 min. |

About 350 pounds of gum base was made. The gum base had normal color, no lumps, no unincorporated oil, and clean taste and odor. Analysis of the gum base by GPC indicated it is very similar to the same base formula made by a conventional batch process. Also, gum made from base of this example had sensory properties virtually the same as gum made with base made by conventional batch process.

EXAMPLES 5–10

Continuous Chewing Gum Manufacture

In Examples 5–10, the chewing gum base is made in a blade-and-pin mixer, which is then also used to complete the making of the chewing gum composition. In order to accomplish the total chewing gum manufacture using the preferred blade-and-pin mixer 200 (FIG. 17), it is advantageous to maintain the rpm of the mixing screw 120 at less than about 150, preferably less than about 100. Also, the mixer temperature is preferably optimized so that the gum base is at about 130° F. or lower when it initially meets the other chewing gum ingredients, and the chewing gum product is at about 130° F. or lower (preferably 125° F. or lower) when it exits the mixer. This temperature optimization can be accomplished, in part, by selectively heating and/or water cooling the barrel sections surrounding the mixing zones 220, 230, 240, 250 and 260 (FIG. 23).

In order to manufacture the gum base, the following preferred procedure can be followed. The elastomer, filler, and at least some of the elastomer solvent are added to the first large feed port 212 in the feed zone 210 of the mixer 200, and are subjected to highly dispersive mixing in the first mixing zone 220 while being conveyed in the direction of the arrow 122. The remaining elastomer solvent (if any) and polyvinyl acetate are added to the second large feed port 232 in the second mixing zone 230, and the ingredients are subjected to a more distributive mixing in the remainder of the mixing zone 230.

Fats, oils, waxes (if used), emulsifiers and, optionally, colors and antioxidants, are added to the liquid injection ports 241 and 243 in the third mixing zone 240, and the ingredients are subjected to distributive mixing in the mixing zone 240 while being conveyed in the direction of the arrow 122. At this point, the gum base manufacture should be complete, and the gum base should leave the third mixing zone 240 as a substantially homogeneous, lump-free compound with a uniform color.

The fourth mixing zone 250 is used primarily to cool the gum base, although minor ingredient addition may be accomplished. Then, to manufacture the final chewing gum product, glycerin, corn syrup, other bulk sugar sweeteners, high intensity sweeteners, and flavors can be added to the fifth mixing zone 260, and the ingredients are subjected to distributive mixing. If the gum product is to be sugarless, hydrogenated starch hydrolyzate or sorbitol solution can be substituted for the corn syrup and powdered alditols can be substituted for the sugars.

Preferably, glycerin is added to the first liquid injection port 261 in the fifth mixing zone 260. Solid ingredients (bulk sweeteners, encapsulated high intensity sweeteners, etc.) are added to the large feed port 262. Syrups (corn syrup, hydrogenated starch hydrolyzate, sorbitol solution, etc.) are added to the next liquid injection port 263, and flavors are added to the final liquid injection port 264. Flavors can alternatively be added at ports 261 and 263 in order to help plasticize the gum base, thereby reducing the temperature and torque on the screw. This may permit running of the mixer at higher rpm and throughput.

The gum ingredients are compounded to a homogeneous mass which is discharged from the mixer as a continuous stream or "rope". The continuous stream or rope can be deposited onto a moving conveyor and carried to a forming station, where the gum is shaped into the desired form such as by pressing it into sheets, scoring, and cutting into sticks. Because the entire gum manufacturing process is integrated into a single continuous mixer, there is less variation in the product, and the product is cleaner and more stable due to its simplified mechanical and thermal histories.

The following Examples 13–22 were run using a Buss kneader with a 100 mm mixer screw diameter, configured in the preferred manner described above (unless indicated otherwise), with five mixing zones, a total mixing L/D of 19, and an initial conveying L/D of 1⅓. No die was used at the end of the mixer, unless indicated otherwise, and the product mixture exited as a continuous rope. Each example was designed with feed rates to yield chewing gum product at the rate of 300 pounds per hour.

Liquid ingredients were fed using volumetric pumps into the large feed ports and/or smaller liquid injection ports generally positioned as described above, unless otherwise indicated. The pumps were appropriately sized and adjusted to achieve the desired feed rates.

Dry ingredients were added using gravimetric screw feeders into the large addition ports positioned as described above. Again, the feeders were appropriately sized and adjusted to achieve the desired feed rates.

Temperature control was accomplished by circulating fluids through jackets surrounding each mixing barrel zone and inside the mixing screw. Water cooling was used where temperatures did not exceed 200° F., and oil cooling was used at higher temperatures. Where water cooling was desired, tap water (typically at about 57° F.) was used without additional chilling. Temperatures were recorded for both the fluid and the ingredient mixture. Fluid temperatures were set for each barrel mixing zone (corresponding to zones 220, 230, 240, 250 and 260 in FIGS. 23 and 24), and are reported below as Z1, Z2, Z3, Z4 and Z5, respectively. Fluid temperatures were also set for the mixing screw 120, and are reported below as S1.

Actual mixture temperatures were recorded near the downstream end of mixing zones 220, 230, 240 and 250; near the middle of mixing zone 260; and near the end of mixing zone 260. These mixture temperatures are reported below as T1, T2, T3, T4, T5 and T6, respectively. Actual mixture temperatures are influenced by the temperatures of the circulating fluid, the heat exchange properties of the mixture and surrounding barrel, and the mechanical heating from the mixing process, and often differ from the set temperatures due to the additional factors.

All ingredients were added to the continuous mixer at ambient temperature (about 77° F.) unless otherwise noted.

EXAMPLE 5

This example illustrates the preparation of a spearmint flavored non-tack sugar chewing gum. A mixture of 24.2% terpene resin, 29.7% dusted ground butyl rubber (75% rubber with 25% fine ground calcium carbonate as an anti-blocking aid) and 46.1% fine ground calcium carbonate was fed at 25 lb/hr into the first large feed port (port 212 in FIGS. 23 and 24). Low molecular weight polyisobutylene (mol. wt.=12,000), preheated to 100° C., was also added at 6.3 lb/hr into this port.

Ground low molecular weight polyvinyl acetate was added at 13.3 lb/hr into the second large feed port (port 232 in FIGS. 23 and 24).

A fat mixture, preheated to 83° C., was injected into the liquid injection ports in the third mixing zone (ports 241 and 243 in FIG. 23), at a total rate of 18.4 lb/hr, with 50% of the mixture being fed through each port. The fat mixture included 30.4% hydrogenated soybean oil, 35.4% hydrogenated cottonseed oil, 13.6% partially hydrogenated soybean oil, 18.6% glycerol monostearate, 1.7% cocoa powder, and 0.2% BHT.

Glycerin was injected into the first liquid injection port in the fifth mixing zone (port 261 in FIG. 23) at 3.9 lb/hr. A mixture of 1.1% sorbitol and 98.9% sugar was added into the large feed port in the fifth mixing zone (port 262 in FIG. 23) at 185.7 lb/hr. Corn syrup, preheated to 44° C., was added into the second liquid injection port in the fifth mixing zone (port 263 in FIG. 23) at 44.4 lb/hr. Spearmint flavor was added into the third liquid injection port in the fifth mixing zone (port 264 in FIG. 23) at 3.0 lb/hr.

The zone temperatures Z1–Z5 were set (in °F.) at 350, 350, 150, 57 and 57, respectively. The mixing screw temperature S1 was set at 120° F. The mixture temperatures T1–T6 were measured at steady state (in °F.) as 235, 209, 177, 101 and 100, and fluctuated slightly during the trial. The screw rotation was 80 rpm.

The chewing gum product exited the mixer at 120° F. The product was comparable to that produced by conventional pilot scale batch processing. The chew was slightly rubbery but no base lumps were visible.

EXAMPLE 6

This example illustrates the preparation of a peppermint flavored non-tack sugar chewing gum. A dry mixture of 57% dusted ground butyl rubber (75% rubber, 25% calcium carbonate) and 43% fine ground calcium carbonate was added at the first large feed port 212 (FIG. 23), at 13.9 lb/hr. Molten polyisobutylene (preheated to 100° C.) was also added to port 212 at 9.5 lb/hr.

Ground low molecular weight polyvinyl acetate was added to port 232 at 13.0 lb/hr.

A fat mixture (preheated to 82° C.) was pumped 50/50 into ports 241 and 243 at a total rate of 23.6 lb/hr. The fat mixture included 33.6% hydrogenated cottonseed oil, 33.6% hydrogenated soybean oil, 24.9% partially hydrogenated soybean oil, 6.6% glycerol monostearate, 1.3% cocoa powder and 0.1% BHT. Glycerin was added to port 261 at 2.1 lb/hr. A mixture of 98.6% sugar and 1.4% sorbitol was added to port 262 at 196 lb/hr. Corn syrup (preheated to 40° C.) was added to port 263 at 39.9 lb/hr. Peppermint flavor was added to port 264 at 2.1 lb/hr.

The zone temperatures (Z1–Z5, °F.) were set at 350, 350, 300, 60 and 60, respectively. The screw temperature (S1) was set at 200° F. The mixture temperatures (T1–T6, °F.) were measured as 297, 228, 258, 122, 98 and 106, respectively. The screw rotation was 85 rpm.

The chewing gum product exited the mixer at 119° F. The finished product was free of lumps but was dry and lacked tensile strength. These defects were attributed to the formula rather than the processing.

EXAMPLE 7

This example illustrates the preparation of a spearmint flavored gum for pellet coating. A blend of 27.4% high molecular weight terpene resin, 26.9% low molecular weight terpene resin, 28.6% dusted ground butyl rubber (75% rubber, 25% calcium carbonate) and 17.1% fine ground calcium carbonate was fed into the first large port 212 (FIG. 23), at 33.5 lb/hr. Molten polyisobutylene (100° C.) was pumped into the same port at 1.3 lb/hr.

Low molecular weight polyvinyl acetate was fed to port 232 at 19.8 lb/hr.

A fat mixture (82° C.) was added 50/50 into ports 241 and 243, at a total rate of 17.4 lb/hr. The fat mixture included 22.6% hydrogenated cottonseed oil, 21.0% partially hydrogenated soybean oil, 21.0% hydrogenated soybean oil, 19.9% glycerol monostearate, 15.4% lecithin and 0.2% BHT.

Sugar was fed into port 262 at 157.8 lb/hr. Corn syrup (40° C.) was added to port 263 at 68.4 lb/hr. Spearmint flavor was added to port 264 at 1.8 lb/hr.

The zone temperatures (Z1–Z5, °F.) were set at 160, 160, 110, 60 and 60, respectively. The screw temperature (S1) was set at 68° F. The mixture temperatures (T1–T6, °F.) were measured as 230, 215, 166, 105, 109 and 111, respectively. The screw rotation was 80 rpm.

The chewing gum product exited the mixer at 121° F. The product was firm and cohesive when chewed (normal for a pellet center). No base lumps were visible.

EXAMPLE 8

This example illustrates the preparation of a fruit-flavored sugar gum. A mixture of 39.3% dusted ground butyl rubber (75% rubber, 25% calcium carbonate), 39.1% low molecular weight terpene resin and 21.6% fine ground calcium carbonate was added to the first large feed port 212 (FIG. 23) at 20.6 lb/hr.

A mixture of 33.0% low molecular weight terpene resin and 67.0% low molecular weight polyvinyl acetate was added at 24.4 lb/hr into the second large feed port 232. Polyisobutylene (preheated to 100° C.) was also added at 1.0 lb/hr into the port 232.

A fat/wax composition (82° C.) was injected 50/50 into the liquid injection ports 241 and 243, at a total rate of 14.0 lb/hr. The composition included 29.7% paraffin wax, 21.7% microcrystalline wax (m.p.=170° F.), 5.7% microcrystalline wax (m.p.=180° F.), 20.5% glycerol monostearate, 8.6% hydrogenated cottonseed oil, 11.4% soy lecithin, 2.1% cocoa powder, and 0.3% BHT.

Glycerin was injected into the liquid injection port 261 at 3.3 lb/hr. A mixture of 88.5% sucrose and 11.5% dextrose monohydrate was added at 201.0 lb/hr into the large port 262. Corn syrup (40° C.) was injected at 3.0 lb/hr into the liquid injection port 263, and a mixture of 88.9% fruit flavor and 11.1% soy lecithin was injected at 2.7 lb/hr into the liquid injection port 264.

The zone temperatures (Z1–Z5, °F.) were set at 425, 425, 200, 61 and 61, respectively. The screw temperature (S1) was set at 66° F. The mixture temperatures (T1–T6, °F.) were measured as 359, 278, 185, 105, 100 and 109, respectively. The screw rotation was set at 70 rpm.

The chewing gum product exited the mixer at 122° F. The product was very soft while warm and fell apart during chewing. However, this was not atypical for this product. After aging for two months, the product was again chewed and found to have excellent texture and flavor. No rubber lumps were visible.

EXAMPLE 9

This example illustrates the preparation of a sugar chunk bubble gum. For this example, the mixer configuration was varied slightly from the preferred configuration described above and used for Examples 5–8. Specifically, a round-hole 30 mm die was installed at the exit end of the mixer.

A blend of 68.9% high molecular weight polyvinyl acetate and 31.1% ground talc was added into the first large feed port 212 (FIG. 23), at 35.4 lb/hr. Polyisobutylene (preheated to 100° C.) was also added to port 212 at 3.95 lb/hr. Further downstream, in the first mixing zone 220, acetylated monoglyceride was injected at 2.6 lb/hr, using a liquid injection (hollow barrel pin) port not shown in FIG. 23.

Additional polyisobutylene (100° C.) at 3.95 lb/hr, and glycerol ester of partially hydrogenated wood rosin at 13.4 lb/hr, were added into the second large port 232. A mixture of 43.6% glycerol monostearate, 55.9% triacetin and 0.5% BHT was added at 6.7 lb/hr into the liquid injection port 241.

Glycerin was injected at 2.1 lb/hr into the liquid injection port 261. A mixture of 98.4% sucrose and 1.6% citric acid was added at 170.4 lb/hr into the large port 262. Corn syrup (40° C.) was injected at 58.5 lb/hr into liquid injection port 263, and a mixture of 60% lemon-lime flavor and 40% soy lecithin was added at 3.0 lb/hr into the liquid injection port 264.

The zone temperatures (Z1–Z5, °F.) were ultimately set at 440, 440, 160, 61 and 61, respectively. The screw temperature (S1) was ultimately set at 80° F. The mixture temperatures (T1–T6, °F.) were ultimately measured as 189, 176, 161, 97, 108 and 112, respectively. The screw rotation was 55 rpm.

At first, the product exited the extruder at 140° F. and exhibited signs of heat stress. The zone temperatures Z1 and Z2 were then reduced by 10° F. each, and the screw temperature S1 was raised by 20° F., to the values shown above. This caused the chewing gum exit temperature to drop to 122° F., and the product quality improved markedly.

During chewing, the product exhibited excellent texture, flavor, and bubble blowing characteristics. No rubber lumps were visible.

EXAMPLE 10

This example illustrates the preparation of a spearmint flavored sugarless gum. A mixture of 42.1% fine ground calcium carbonate, 18.9% glycerol ester of wood rosin, 16.7% glycerol ester of partially hydrogenated wood rosin, 17.0% ground butyl rubber, and 5.3% dusted ground (25:75) styrene butadiene rubber (75% rubber, 25% calcium carbonate) was added into port 212 (FIG. 23) at 38.4 lb/hr.

Low molecular weight polyvinyl acetate at 12.7 lb/hr, and polyisobutylene (preheated to 100° C.) at 7.6 lb/hr, were added into port 232.

A fat mixture (82° C.) was injected 50/50 into ports 241 and 243, at a total rate of 20.9 lb/hr. The fat mixture included 35.7% hydrogenated cottonseed oil, 30.7% hydrogenated soybean oil, 20.6% partially hydrogenated soybean oil, 12.8% glycerol monostearate and 0.2% BHT.

Unlike the previous examples, glycerin was injected at 25.5 lb/hr into the fourth mixing zone 250 (FIG. 23) through a liquid injection port (not shown). A coevaporated blend of hydrogenated starch hydrolysate and glycerin (at 40° C.) was injected further downstream in the fourth mixing zone 250 through another liquid injection port (not shown). The coevaporated blend included 67.5% hydrogenated starch hydrolysate solids, 25% glycerin and 7.5% water.

A mixture of 84.8% sorbitol, 14.8% mannitol and 0.4% encapsulated aspartame was added into port 262 in the fifth mixing zone 260, at 162.3 lb/hr. A mixture of 94.1% spearmint flavor and 5.9% lecithin was injected at 5.1 lb/hr into the port 264 located further downstream.

The zone temperatures (Z1–Z5, °F.) were set at 400, 400, 150, 62 and 62, respectively. The screw temperature (S1) was set at 66° F. The mixture temperatures (T1–T6, °F.) were measured as 307, 271, 202, 118, 103 and 116. The mixing screw rotation was 69 rpm.

The chewing gum product exited the mixer at 117° F. The gum had good appearance with no sorbitol spots or rubber lumps. The gum was slightly wet to the touch, sticky and fluffy (low density), but was acceptable. During chewing, the gum was considered soft initially but firmed up with continued chewing.

EXAMPLES 11–17

These examples illustrate the preparation of peppermint flavored sugar gum having some of the fat/oil added in the first zone with the hard elastomer. For these examples, the Buss extruder, shown in FIGS. 23 and 24 has five barrel mixing zones (corresponding to zones 220, 230, 240, 250, and 260) but zone 250 was eliminated. Base is mixed in zones 220, 230 and 240, and gum is mixed in zone 260.

For Example 11 (comparative), a blend of 28.3% butyl rubber, 12.9% low molecular weight terpene resin, 13.1% high molecular weight terpene resin and 45.7% calcium carbonate was added to the first large feed port 212 (FIG. 23) at 23.8 lb/hr.

A mixture of 8.6% high molecular weight polyvinyl acetate, 68.8% low molecular weight polyvinyl acetate, 10.3% low molecular weight terpene resin, 10.4% high molecular weight terpene resin and 1.9% cocoa powder was added into the second layer feed port 232 at 18.6 lb/hr. Polyisobutylene (preheated to 100° C.) was also added at 3.5 lb/hr. into the port 232.

A fat composition (82° C.) was injected 50/50 into the liquid injection ports 241 and 243 at a total rate of 14.1 lb/hr. The composition included 32.7% hydrogenated cottonseed oil, 20.3% glycerol monostearate, 19.2% hydrogenated soybean oil, 74.1% lecithin, 13.5% partially hydrogenated cottonseed oil and 0.2% BHT.

Glycerin was injected into port 261 at 3.9 lb/hr. A mixture of 85% sucrose and 15% dextrose monohydrate was added at 203.1 lb/hr. into the large port 262. Corn syrup (40° C.) was injected at 30.0 lb/hr. into the liquid injection port 263, and a mixture of 90% peppermint flavor and 10% lecithin was injected at 3.0 lb/hr. into the liquid injection port 264. The zone temperatures (Z1, Z2, Z3, Z5) were set at 300, 300, 100, and 70° F., respectively. The screw temperature (S1) was set at 100° F. The mixture temperatures use 305, 246, 155 and 100° F. The screw rotation was set at 61 RPM. The chewing gum product exited the mixer at 122° F.

For examples 12–14, the same formulation and procedures were used to make three additional base and gum products using the Buss extruder. The differences were that the formula amount of butyl rubber was only blended at room temperature with hydrogenated soybean oil at a level of 1% (Ex. 12), 2.5% (Ex. 13), and 5% (Ex. 14) of the butyl rubber. This gave an early addition of liquid oil in zone 220. The remaining hydrogenated soybean oil was added with the other fats/oils into the liquid injection ports 241 and 243 as noted in Examples 6–11.

Addition rates of the rubber/fiber/resin were about 24.5 to 24.6 lb/hr. Rates for the PVAC/resin were about 17.9 to 18.2 lb per hour. Rates for the fat/oil composition was 13.8 to 14.1 lb/hr., and the rate for polyisobutylene wad 3.5 lb/hr.

For Examples 15–17, the same formulation and procedures were used to make three additional base and gum products using the Buss extruder. The differences in these three samples were that glycerol monostearate was used in place of hydrogenated soybean oil that was blended with butyl rubber. The level of glycerol monostearate used was 1% (Ex. 15), 2.5% (Ex. 16), and 5% (Ex. 17) of the butyl rubber. The remaining glycerol monostearate was added with the other fats/oils into the liquid injection ports 241 and 243.

Sensory results of Examples 12–14 and 15–17 showed that there was little difference in the base or gum as a result of adding 1% or 2.5% softening agent added very early with the rubber. At 5% hydrogenated soybean oil, the base and gum was slightly softer for Example 14. However, Example 17 with 5% glycerol monostearate did not show this same added softness.

These tests showed that softening agents may be added very early in the base batch and be successfully added to make a chewing gum product.

It should be appreciated that the methods of the present invention are capable of being incorporated in the form of a variety of embodiments, only a few of which have been illustrated and described above. The invention may be embodied in other forms without departing from its spirit or essential characteristics. It will be appreciated that the addition of some other ingredients, process steps, materials or components not specifically included will have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A process for continuously producing a chewing gum base comprising the steps of:
   a) continuously adding chewing gum base ingredients, including a hard elastomer, filler and one or more lubricating agents comprising a softening agent into a continuous mixer having a plurality of spatially separated feed inlets, a portion of said softening agent being introduced into said mixer through a first feed inlet and a second portion of said softening agent being introduced into said mixer through a second feed inlet located downstream of said first feed inlet;
   b) subjecting the chewing gum base ingredients to continuous mixing operations within the mixer, thereby producing a chewing gum base; and
   c) continuously discharging the chewing gum base from the mixer while chewing gum base ingredients continue to be introduced and mixed within the mixer.

2. The process of claim 1 wherein the softening agent is selected from the group consisting of fats, oils, waxes, emulsifiers and mixtures thereof.

3. The process of claim 2 wherein the fats are selected from the group consisting of hydrogenated vegetable oils, partially hydrogenated vegetable oils, lard, tallow, cocoa butter, solid lipids made from triglycerides of fatty acids and mixtures thereof.

4. The process of claim 2 wherein the oils are selected from the group consisting of soybean oil, cottonseed oil, palm oil, palm kernel oil, coconut oil, sunflower oil, corn oil, captrin, liquid lipids made from triglycerides of fatty acids and mixtures thereof.

5. The process of claim 2 wherein the waxes are selected from the group consisting of paraffin wax, microcrystalline wax, polywax, natural waxes and mixtures thereof.

6. The process of claim 2 wherein the emulsifiers are selected from the group consisting of mono and diglycerides of fatty acids, glycerol mono and distearate, glycerol triacetate, acetylated monoglyceride, polyglycerol esters, sugar and polyol esters, lecithin, triacetin, carbohydrate polyesters, and mixtures thereof.

7. The process of claim 1 wherein the continuous mixer has at least one dispersive mixing zone and at least one distributive mixing zone downstream of said dispersive mixing zone.

8. The process of claim 7 wherein said first and second feed inlets are both located adjacent said distributive mixing zone.

9. The process of claim 7 wherein the first feed inlet is located prior to said distributive mixing zone and said second feed inlet is located adjacent said distributive mixing zone.

10. The process of claim 7 wherein the dispersive mixing zone functions as such due to a combination of the use of high shear mixing elements in the mixer, the gum base ingredients being mixed therein, and the temperature and fullness conditions of the mixer.

11. The process of claim 1 wherein the continuous mixer comprises one piece of equipment.

12. The process of claim 1 wherein the mixer comprises a blade-and-pin mixer.

13. The process of claim 1 wherein the hard elastomer is brought into contact with the filler prior to any substantial mastication of the hard elastomer.

14. The process of claim 1 wherein the lubricating agents comprise an elastomer solvent and the elastomer solvent is also introduced into the continuous mixer at two or more of said spatially separated feed inlet locations.

15. The process of claim 1 wherein the gum base is discharged from the mixer as part of a chewing gum composition.

16. The process of claim 1 wherein the hard elastomer is all added at a first feed inlet.

17. The process of claim 1 wherein the lubricating agents further comprise one or more ingredients selected from the group consisting of elastomer solvents, soft elastomers, plastic polymers and mixtures thereof.

18. The process of claim 17 wherein the plastic polymers comprises polyvinyl acetate.

19. The process of claim 17 wherein the elastomer solvents are selected from the group consisting of terpene resins, natural rosin esters and mixtures thereof.

20. The process of claim 17 wherein the hard elastomers have a Flory molecular weight of over about 200,000 and the soft elastomers have a Flory molecular weight of below about 100,000.

21. The process of claim 20 wherein the soft elastomers are selected from the group consisting of polyisobutylene, polybutadiene and mixtures thereof.

22. The process of claim 20 wherein the hard elastomer is selected from the group consisting of isobutylene-isoprene copolymer, styrene-butadiene rubber, natural rubbers, natural gums and mixtures thereof.

23. The process of claim 1 wherein the softening agent comprises fats, oils or a mixture thereof and said fats, oils or a mixture thereof is introduced into the continuous mixer at two or more of said spatially separated feed inlet locations.

24. A process for making a chewing gum composition wherein a gum base is made according to the process of claim 1 and mixed with flavoring agents and bulking and sweetening agents to make said chewing gum composition.

25. A process for continuously producing a chewing gum base comprising the steps of:
   a) continuously adding chewing gum base ingredients, including a hard elastomer, filler and one or more lubricating agents comprising a softening agent, into a continuous mixer having a plurality of spatially separated feed inlets, high shear mixing elements and low shear mixing elements downstream from said high shear mixing elements, at least a portion of said hard elastomer, at least a portion of said filler and a portion of said lubricating agents being introduced into said mixer through one or more feed inlets located at or before the high shear mixing elements and a portion of said softening agent being introduced into said mixer through a first feed inlet and a second portion of said softening agent being introduced into said mixer through a second feed inlet located downstream of said first feed inlet;

b) subjecting the chewing gum base ingredients to continuous mixing operations within the mixer, thereby producing a chewing gum base; and c) continuously discharging the chewing gum base from the mixer while chewing gum base ingredients continue to be introduced and mixed within the mixer.

26. The process of claim 25 wherein the mixer is operated at a peak temperature greater than 175° F. at the high shear mixing elements.

27. The process of claim 25 wherein the mixer is operated at a peak temperature greater than 250° F. at the high shear mixing elements.

28. The process of claim 25 wherein the mixer is operated at a peak temperature greater than 300° F. at the high shear mixing elements.

29. A process for making a chewing gum composition wherein a gum base is made according to the process of claim 25 and mixed with flavoring agents and bulking and sweetening agents to make said chewing gum composition.

* * * * *

UNITED STATES PATENT AND TRADEMARK OFFICE
CERTIFICATE OF CORRECTION

PATENT NO. : 5,773,053
DATED : June 30, 1998
INVENTOR(S) : Joo H. Song et al.

It is certified that error appears in the above-indentified patent and that said Letters Patent is hereby corrected as shown below:

On the Title Page

In column 1, item [63], line 5, under "Related U.S. Application Data", change "135,589" to --136,589--.

In column 2, line 14, under "OTHER PUBLICATIONS", change "Plymer" to --Polymer--.

On page 2, column 2, line 6, change "Bruckman et al." to --Bruckmann et al.--.

In the Claims

In claim 18, line 2, change "comprises" to -comprise--.

Signed and Sealed this

Fourteenth Day of March, 2000

Attest:

Attesting Officer

Q. TODD DICKINSON

Commissioner of Patents and Trademarks